(12) United States Patent
Jaggers et al.

(10) Patent No.: US 12,505,391 B2
(45) Date of Patent: *Dec. 23, 2025

(54) AUTOMATED GENERATION OF CONDITION STATE INFORMATION FOR ONE OR MORE MACHINES, DEVICES, OR SYSTEMS ASSOCIATED WITH SERVICE OR REPAIR EVENTS

(71) Applicant: XOEye Technologies, Inc., Nashville, TN (US)

(72) Inventors: Adam Jaggers, Pleasantview, TN (US); C. Aaron Salow, Nashville, TN (US); Matthew Eby, Brentwood, TN (US)

(73) Assignee: XOEYE TECHNOLOGIES, INC., Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/054,352

(22) Filed: Feb. 14, 2025

(65) Prior Publication Data

US 2025/0190892 A1    Jun. 12, 2025

Related U.S. Application Data

(63) Continuation of application No. 18/660,750, filed on May 10, 2024, now abandoned, which is a
(Continued)

(51) Int. Cl.
*G06Q 10/0631*    (2023.01)
*G06F 9/451*    (2018.01)
(Continued)

(52) U.S. Cl.
CPC ..... *G06Q 10/063112* (2013.01); *G06F 9/453* (2018.02); *G06Q 10/063114* (2013.01); *G06Q 10/06398* (2013.01); *G06Q 10/20* (2013.01)

(58) Field of Classification Search
CPC .......... G09B 19/003; G09B 5/02; G09B 5/04; G09B 5/065; G06N 20/00;
(Continued)

(56) References Cited

U.S. PATENT DOCUMENTS 5,644,686 A    7/1997    Hekmatpour
8,321,253 B2 *    11/2012    Mitchell .......... G06Q 10/06311
                                                705/7.17
(Continued)

OTHER PUBLICATIONS

Woessmann, Ludger, "Vocational Education in Apprenticeship Systems: Facing the Life-Cycle Trade-Offs", University of Munich and Ino Institute, Oct. 6, 2017.
(Continued)

*Primary Examiner* — Malina D. Blaise
(74) *Attorney, Agent, or Firm* — Thomas | Horstemeyer, LLP

(57) ABSTRACT

Examples related to facilitating the training, assessment, and dispatching of technicians to a customer location for at least the purpose of servicing or repairing machines, devices, or systems present at the customer location are presented. The technician can be selected for dispatch to the customer location by review of database information, including training information for the technician, among other things. While at the customer location, the technician can be provided with training information delivered via a training module, where such training material content can comprise written materials, photos, video, virtual assistance, remote assistance, games, or the like. The technician can generate videos or other collateral while at the customer location, which can be included for use in a library of training materials for subsequent use, or for other purposes. Various systems and processes for facilitating the selection, management and deployment of training materials for technicians are also provided herein.

19 Claims, 7 Drawing Sheets

Related U.S. Application Data continuation of application No. 17/462,763, filed on Aug. 31, 2021, now Pat. No. 11,995,582, which is a continuation-in-part of application No. 16/879,268, filed on May 20, 2020, now Pat. No. 11,113,987.

(51) Int. Cl.
*G06Q 10/0639* (2023.01)
*G06Q 10/20* (2023.01)

(58) Field of Classification Search
CPC ..... G06K 19/06037; G06Q 10/063112; G06Q 10/06316; G06Q 10/20; G06Q 30/0282; G06Q 50/2053; G06Q 50/2057
See application file for complete search history.

(56) References Cited

U.S. PATENT DOCUMENTS

| | | | | |
|---|---|---|---|---|
| 8,463,636 | B2* | 6/2013 | Ahsan | G06Q 10/06 705/7.14 |
| 8,516,572 | B2* | 8/2013 | Chim | G06F 21/33 703/1 |
| 9,639,677 | B1 | 5/2017 | O'Malley | |
| 9,849,388 | B2 | 12/2017 | Cohen | |
| 9,879,875 | B2* | 1/2018 | Quam | F24F 11/56 |
| 10,115,065 | B1 | 10/2018 | Fama | |
| 10,423,934 | B1 | 9/2019 | Zanghi | |
| 2010/0312605 | A1* | 12/2010 | Mitchell | G06Q 10/06311 705/7.13 |
| 2012/0016779 | A1* | 1/2012 | Landry | G06Q 30/012 705/305 |
| 2012/0253484 | A1* | 10/2012 | Burich | A63B 71/06 700/91 |
| 2013/0074180 | A1* | 3/2013 | Chim | G06F 21/33 726/19 |
| 2014/0324776 | A1 | 10/2014 | Novak et al. | |
| 2016/0370798 | A1 | 12/2016 | Georgeson et al. | |
| 2020/0166909 | A1 | 5/2020 | Noone et al. | |
| 2020/0210268 | A1* | 7/2020 | Nuthi | G05B 23/0275 |

OTHER PUBLICATIONS

Harnish, et al. "Work-Based Learning in Occupational Education and Training", The Journal of Technology Studies, 1998.
International Search Report for PCT/US2021/033330 mailed Aug. 25, 2021.

* cited by examiner

AUTOMATED GENERATION OF CONDITION STATE INFORMATION FOR ONE OR MORE MACHINES, DEVICES, OR SYSTEMS ASSOCIATED WITH SERVICE OR REPAIR EVENTS

CROSS REFERENCE TO RELATED APPLICATIONS

This application is a continuation claiming priority to, and the benefit of, U.S. non-provisional application Ser. No. 18/660,750, filed May 10, 2024, which is a continuation claiming priority to, and the benefit of, U.S. non-provisional application entitled "AUTOMATED GENERATION OF CONDITION STATE INFORMATION FOR ONE OR MORE MACHINES, DEVICES, OR SYSTEMS ASSOCIATED WITH SERVICE OR REPAIR EVENTS" having Ser. No. 17/462,763, filed Aug. 31, 2021, now U.S. Pat. No. 11,995,582, which is a continuation-in-part claiming priority to, and the benefit of, U.S. non-provisional application entitled "TRAINING AND MANAGEMENT OF TECHNICIANS IN THE SERVICE OR REPAIR OF MACHINES, DEVICES, OR SYSTEMS" having Ser. No. 16/879,268, filed May 20, 2020, now U.S. Pat. No. 11,113,987, all of which are hereby incorporated by reference in their entireties.

FIELD OF THE DISCLOSURE

The present disclosure relates to systems and methods to generate condition state information for one or more machines, devices, or systems. The condition state information can be used to predict current condition state information for a specific machine, device, or system. Condition state information can be used in conjunction with service or repair events associated with a machine, device, or system of interest. Condition state information can be generated from machine learning processes that use information from a plurality of machines, devices, or systems. In some implementations, human validation can be provided for the generated information. The technician can generate videos or other collateral while at a service or repair event location, where such collateral can be included for use in a library of machine learning information for subsequent condition state determinations, or for other purposes.

BACKGROUND OF THE DISCLOSURE

As of mid-2019, unemployment is at record low levels in the US and throughout the world. Companies are struggling to find qualified workers to fill open jobs. Even if the global economy slows in the future, a skills gap will continue to exist in the so-called "skilled trades." As would be appreciated, skilled trades are occupations that require a special skill, knowledge or ability that is typically obtained at a college, technical school, or through training. Historically, many skilled trade positions were staffed by persons who had obtained necessary training in apprenticeships or other on-the-job training.

There are several reasons why the skills gap in the skilled trades exists. First, an ongoing generational shift is occurring in which older workers are leaving the workforce. Every day for the last several years, as many as 10,000 Baby Boomers approach retirement age, and a large majority have already exited the workforce. Many of these people are leaving behind specialized skills generated over decades of experience, and their retirement means that these skills will immediately be missing from their respective professions.

Of course, such a large group of highly experienced workers cannot immediately be replaced unless there is a replenishment workforce in the pipeline. However, this has not happened, and most experts believe that employers will continue to struggle to find enough trained workers to fill their needs. Companies can, and do, seek to recruit the skilled workers they need by raising wages and improving benefits, but increasing compensation cannot solve a problem when there are just not enough people to fill the number of jobs available.

The declining population of skilled workers has been in existence for many years, but to date no solution has been found to ameliorate the problem. A number of structural problems are blamed for the inability to create a suitable replacement workforce.

First, these older workers are from an era where college was not always seen as a primary path to a prosperous life as it is increasingly seen today. These workers also often grew up around and later entered their family's business; however, such family-owned enterprises are less likely to exist today. For at least this reason, there is a decreasing prevalence of "blue collar" jobs in and around communities, which likely further reduces the likelihood that a young person planning his career will move toward this direction.

The financial crash of 2008 exacerbated the already dire supply of skilled tradespeople. Many contractors shuttered their businesses and did not return to the professions when the economy eventually returned to robustness. A significant number of veteran professionals left the industry during the downturn, thus leaving not only an increasing number of unfilled jobs in a thriving economy, but also a dearth of training resources for new hires to generate the skills needed for themselves to become skilled tradespeople.

Moreover, in the last 20 or so years, many U.S. high schools have eliminated shop classes and other vocational training opportunities, and these budget cuts thus claimed a traditional pathway into a career in the trades. Such hands-on training in high school often served as a gateway to a realization that a student enjoyed and had aptitude for a profession in a skilled trade, but such experience is much less likely for young people today. Even for those students who have access to vocational training in high school, these programs are often perceived as being "alternative" or "second best" to high school coursework that leads to a four year (or more) college education that will lead to a "white collar" job that may be seen as more prestigious and less strenuous. It follows that a young person who is deciding on a career today may not even consider a profession in the skilled trades, even though these jobs are typically very stable and well-paying earlier, especially since there may be substantially less need for the financial and time commitment of college to gain entry level employment.

The nature of the skilled trades requires that a person possess a baseline set of skills before he can work competently, with a broader level of skills being needed to achieve mastery of the requisite skills in an area. Historically, such skills were imparted in apprenticeship programs that often required many years working along-side of an already-skilled tradesperson. Of course, the continued retirement of these skilled people means that traditional apprenticeship training is no longer practical in many trades. While new entrants to a trade may gain training in a technical college or other training environment, the person must then delay employment—and pay—for the time it takes to obtain the requisite skills to obtain entry level employment in their chosen field. Such programs also typically require substantial financial investment. Not only will this not be a viable option for some people who would otherwise be well-suited for a career in a skilled trade, the acute labor shortage cannot immediately be solved even for those persons who are inclined to make the time and financial investment needed to gain entrance into the skilled trades.

Automation is often proposed as a solution to today's labor shortages, and this is true for some jobs where tasks are repetitive and can be predicted such that they can be programmed into automated equipment. However, performance in the skilled trades typically requires complex problem solving and hands-on dexterity that will not be possible using robotic equipment and artificial intelligence for many years, if it ever is possible. Put simply, it will be a long time before there will be a robot configured as a plumber, electrician, engine mechanic, HVAC technician etc. It follows that automation is not a foreseeable solution for the acute shortage of skilled laborers needed today and in the future.

Even for those technicians who gain the training needed to enter a career in the skilled trades, a reality of modern industry is an increasing need for documentation of work done on a machine, device, or system. For those who choose this career path because they are not well-suited for jobs where they must read and write on a regular basis, the requirement to generate a large amount of documentation may be problematic.

Still further, website and video resources are widely available today, and might be proposed as a vehicle to facilitate training for those in the skilled trades. However, the magnitude of available resources makes this an unwieldy concept, especially in the context of a just in time need that would occur on a job site. For example, a search for "repair the compressor on an HVAC," may return many dozens of videos and other resources, but few, if any, of these resources may be directly pertinent to a specific task that needs to be addressed by a technician for a specific machine, device, or system while at a customer location. Moreover, to determine whether a resource would be effective in helping him in his task, he would have to engage with the material (e.g., watch, read, listen to) in its entirety and attempt his task. If the resource was ineffective to impart the necessary training, he would have to find another resource and engage with that material in its entirety. As would thus be appreciated, there is currently lack of certainty in the effectiveness of materials available online in imparting the necessary skills and the possibility of much wasted time. In short, the lack of curation available for online resources that could be relevant to a technician while on a job site or in preparation for visiting a jobsite today makes useful deployment of possibly relevant materials virtually impossible.

Even if there existed a readily accessible library of training resources retrievable by a technician on an as-needed basis, such resources may need to be configured for the specific characteristics of the technician. For example, some technicians may learn best by reading a wiring diagram, some by watching a video, or others in a gaming environment. Other technicians may need detailed training in an area, whereas others may already have the necessary training in a particular topic and may only be seeking a "refresher" in the topic.

There remains a need to improve the training of technicians in the skilled trades. There is a need to improve the management and deployment of online training resources that can be used in the training of technicians. Yet further, there is a need to provide better training materials to technicians in accordance with their skill levels, their real-time needs, and their learning styles, among other things. Yet further, there is a need to improve the engagement of technicians in tasks that are needed for them to succeed in their jobs, such as in training events and the generation of documentation relevant to their jobs. The present disclosure can provide these and other benefits.

SUMMARY OF THE DISCLOSURE

Aspects of the present disclosure are related to training and management technicians. In one aspect, among others, a method of providing training to a technician comprises receiving, by a user or a computer, a request for service; reviewing, by the computer, at least one technician database, where the at least one technician database comprises a plurality of technician profiles; identifying, by the computer, a first technician having at least some of the one or more technician skill sets, where the first technician is associated with a first technician profile; dispatching, by the computer or the user, the first technician to the customer location; identifying, by the computer or the first technician, a second machine, device, or system while the first technician is present at the customer location; and determining, by the computer or the first technician, whether the first technician comprises one or more skill sets suitable for servicing the second machine, device, or system. The request for service can be of a first machine, device, or system, where the first machine, device, or system is at a customer location. The at least one technician database can comprise information associated with one or more technician skill sets, and the one or more technician skill sets can be associated with tasks pertinent to servicing of the first machine, device, or system at the customer location. If the first technician profile indicates that the first technician lacks at least some of the one or more skill sets necessary for servicing the second machine, device, or system while at the customer location, the method can comprise: presenting, by the computer, an information set comprising technician training materials associated with the second machine, device, or system to the first technician, where the technician training materials can be: viewable by the first technician on a display device; and provided as one or more of a recorded video, a virtual reality environment, a game, a remotely located person, or a virtual assistant; and updating, by the computer, the first technician profile to record the presentation of the technician training materials associated with the second machine, device, or system to the first technician.

In one or more aspects, the information set can be presented to the first technician while the first technician is at the customer location or the information set can be presented to the first technician after the first technician leaves the customer location. The first technician profile can comprise information about an identified learning style for the first technician, and the technician training materials presented to the first technician can be associated with the identified learning style. The selection of the technician training materials can optionally incorporate information associated with a condition or status of the first machine, device, or system and, if present, of the second machine, device, or system.

In various aspects, the method can comprise confirming at the customer location whether the first technician is in need of further training associated with the first machine, device, or system and, if the technician is in need of additional training, delivering one or more technician training materials associated with the first machine, device, or system to the first technician while at the customer location. In some aspects, the method can comprise collecting, by the first technician or the computer, information about the first machine, device, or system and, if present, the second machine, device, or system at the customer location; and recording, by the technician or the computer, the collected information in a machine, device, or system database. At least some of the collected information can comprise photos or videos. The method can comprise labeling of the photos or videos for use of the photos or videos to generate a machine, device, or system object library for use in machine learning processes. At least some of the collected information can be generated by imaging of a data plate, QR code, serial number, or text present on the first machine, device, or system and, optionally, on the second machine, device, or system identified at the customer location. The collected information can be used to populate a library of training materials for use in training one or more technicians.

In another aspect, a method of providing training to a technician in need of training comprises selecting, by a user, a first technician, or a computer, a first machine, device, or system in need of, or potentially in need of repair or servicing; identifying, by the user, the first technician, or the computer, at least one skill needed by the first technician; selecting, by the computer, one or more training materials for presentation to the first technician; presenting, by the computer, the selected one or more training materials to the first technician; evaluating, by the computer, whether the first technician has acquired the identified at least one skill after being presented with the one or more training materials, thereby generating a first technician skill level; and updating, by the computer, the information associated with the at least one skill in the information associated with the first technician in the technician database. The identified at least one skill can be associated with the repair or servicing of the first machine, device, or system by the first technician, and the at least one skill can be recorded in information associated with the first technician in a technician database. The one or more training materials can be included in a library of training materials in a technician training module, and the selected one or more training materials can be associated with the identified at least one skill associated with the repair or servicing of the machine, device, or system by the first technician.

In one or more aspects, selection of the one or more training materials can optionally further incorporate retrieving, by the computer, information associated with a condition or status of the first machine, device, or system. The one or more training materials can be selected from a library of content comprising one or more of videos, written material, audio, games, remote interaction with a live person, virtual reality, or augmented reality. At least some of the library of content is associated with one or more ratings generated by a user, and wherein at least one of the one or more ratings is used in the selection of each of the one or more training materials. The first technician can optionally provide at least one technician ranking for each of the one or more training materials presented to the first technician after presentation of the selected one or more training materials to the first technician.

In various aspects, the first technician can provide one or more technician rankings for at least some of the selected one or more training materials, thereby generating one or more ranked content items; the one or more technician rankings can be incorporated into the library of training materials; and the one or more technician rankings can be incorporated in selection of training materials for other technicians or in a subsequent selection of training materials for the first technician. The one or more training materials can be presented to the first technician at a time that the first technician is present with the first machine, device, or system at the customer location or can be presented to the first technician after a time that the first technician is present with the first machine, device, or system at the customer location. The information associated with the first technician in the technician database can include information associated with a learning style of the first technician, and selection of the one or more training material can incorporate the learning style. Information associated with the selection of the one or more training materials and evaluation of the first technician can be included in machine learning processes associated with selection of training materials for other technicians or in a subsequent selection of training materials for the first technician.

Additional advantages of the disclosure will be set forth in part in the description that follows, and in part will be apparent from the description, or may be learned by practice of the disclosure. The advantages of the disclosure will be realized and attained by means of the elements and combination particularly pointed out in the appended claims. It is to be understood that both the foregoing general description and the following detailed description are exemplary and explanatory only and are not restrictive of the disclosure, as claimed.

DETAILED DESCRIPTION OF THE DISCLOSURE

Figure 1:
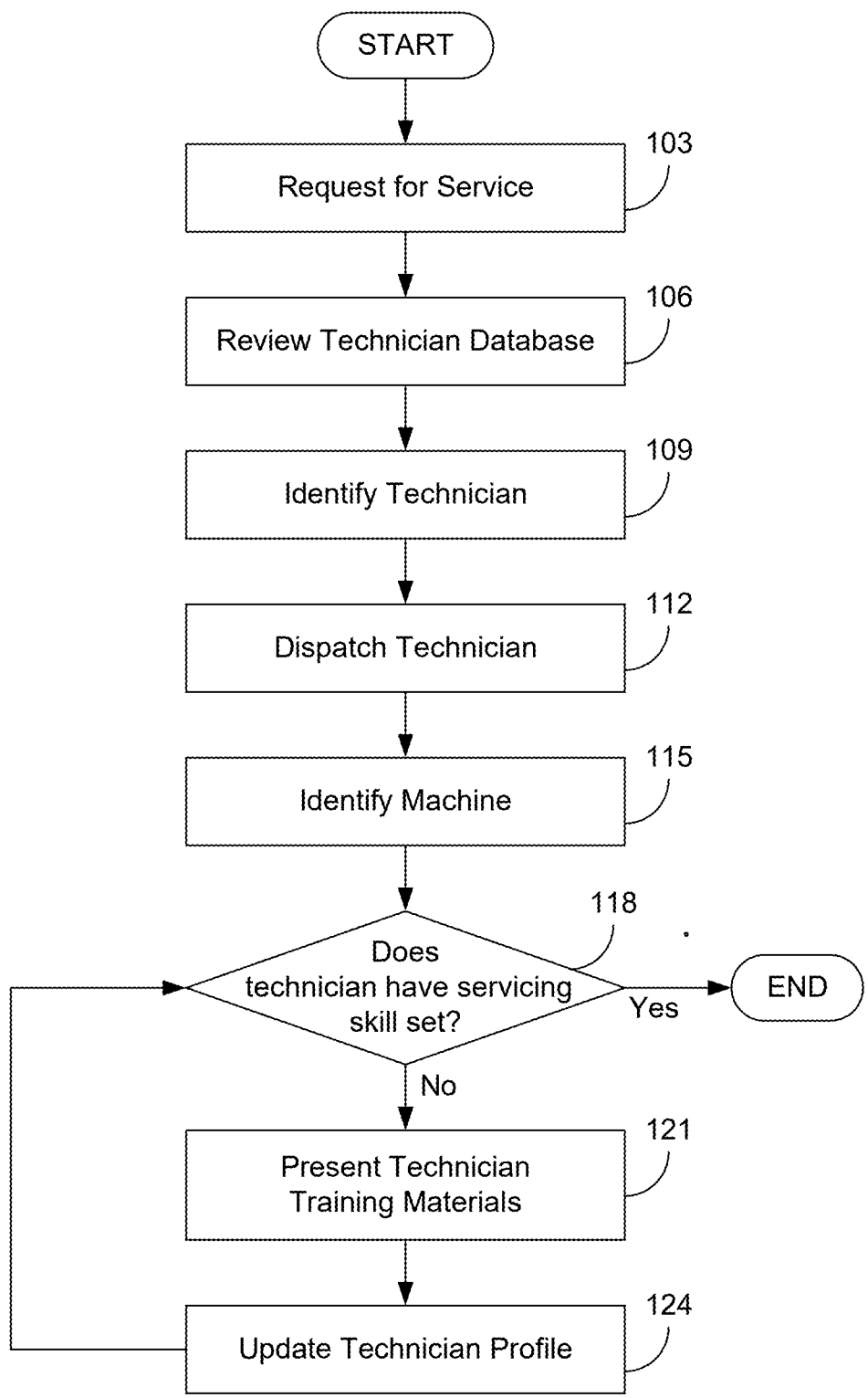
FIGS. 1 and 2 are flowcharts illustrating an example of technical training being provided to a technician, in accordance with various aspects of the present disclosure.

In the following detailed description, reference is made to the accompanying drawings, which form a part hereof, and within which are shown by way of illustration certain aspects by which the subject matter of this disclosure may be practiced. It is to be understood that other aspects may be utilized, and structural changes may be made, without departing from the scope of the disclosure. In other words, illustrative aspects and aspects are described below. But it will of course be appreciated that in the development of any such actual embodiment, numerous implementation-specific decisions must be made to achieve specific goals, such as compliance with system-related and business-related constraints, which may vary from one implementation to another. Moreover, it will be appreciated that such development effort might be complex and time-consuming but would nevertheless be a routine undertaking for those of ordinary skill in the art having the benefit of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Wherever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common patent law definition of "comprising" and is therefore interpreted to be an open term meaning "at least the following" and is also interpreted not to exclude additional features, limitations, aspects, etc.

The term "about" is meant to account for variations due to experimental error. All measurements or numbers are implicitly understood to be modified by the word about, even if the measurement or number is not explicitly modified by the word about.

The term "substantially" (or alternatively "effectively") is meant to permit deviations from the descriptive term that do not negatively impact the intended purpose. Descriptive terms are implicitly understood to be modified by the word substantially, even if the term is not explicitly modified by the word "substantially."

"Skilled trades" are occupations that require a special skill, knowledge or ability which can be obtained at a college, technical school or through specialized training. Skilled trades provide an alternative to jobs that require four years of college education. While skilled trades can be separated into many areas such as manufacturing, technology, energy, and healthcare, they are generally divided into the following three categories (with the listed items being non-limiting examples of each): 1. skilled industrial trades: welders, machinists, mechanics, tool and die makers, programmers; 2. skilled electrical, mechanical, and construction trades: electricians, plumbers, HVAC technicians, gasfitters, carpenters, bricklayers, solar installation and repair technicians, repair technicians, insulators; and 3. skilled service trades: nurses, aides, orderlies, therapists, service technicians. Generally, the present disclosure relates to category 2, however, those in categories 1 and 3 may also be included in one or more of the implementations herein in some circumstances.

In broad constructs, the present disclosure provides methods and systems for facilitating training to a technician in need of training for a skill or the like. Such skills can be expansive both in regard to the technician himself, and in regard to the variety of skills that are applicable. In other words, the relevant skills for which training can be provided can be associated with a task or potential task for which the technician is assigned to complete at a customer location or may be assigned at a future time in the course of his job. As used herein, the skill can be determined in context and, in some implementations, in real-time when the technician is present at a customer location, with non-limiting examples provided hereinafter. In significant aspects, such skills are pertinent to a person who is working in the skilled trades, as such term is defined herein, where such person is referred to as a "technician" herein to distinguish him from other persons (e.g., customers, employers, etc.) that may be relevant to the disclosure herein. In some contexts, the methods and systems herein may be discussed in relation to a "user," where a user can be someone other than the technician, such as the customer, employer, administrative personnel who might interact with the systems and/or the technician.

In one aspect of the present disclosure, a request for service of a machine, device, or system can be received, with a technician being selected for dispatching to a customer location. The technician can be selected by querying, by a computer or a user, a database in which information about the technician is included. The technician can be selected for dispatching to the customer location when he is identified from the technician database information as having at least one skill or talent suitable or pertinent to address the problem or issue associated with the request for service, that is a task that needs to be completed for the machine, device, or system.

Then at least one technician can be deployed to the provided customer location of the machine, device, or system to diagnose, repair, service, or document one or more operations (or lack thereof) for the machine, device, or system. One or more items of training material content comprising information associated with one or more machines, devices, or systems can be presented to the technician while he is at the location. As discussed in more detail hereinafter, the training materials can be one or more of written material (e.g., manuals, diagrams, instructions, etc.), stored video, real-time/live video, stored audio, real-time/live audio, virtual reality (V/R) materials (e.g., virtual assistants, etc.), and/or augmented reality (A/R) materials (e.g., enhanced video, etc.). Such training materials are configurable to provide the technician with instructions and/or assistance and/or training relevant to the diagnosis, repair, servicing or documentation of one or more operations of the machine, device, or system.

While at the location to service a first machine, device, or system, the technician can identify one or more additional machine, device, or system and can collect information about the first machine, device, or system and any identified additional machines, systems, or devices. The collected information can comprise written material, images, videos, and/or sound capture of information associated with all or part of the first machine, device, or system and any additional machines, systems, or devices identified at the customer location, the surrounding locations thereof, and any other information deemed pertinent to the machines, systems, or devices or the location. Such information can be stored for use in the selection of technicians and/or deployment of training materials as discussed further herein.

Information presented to and collected by the technician at the customer location can be associated with a machine learning system. In this regard, the information, for example, training materials, associated with the first machine, device, or system, the operations thereof, as well as pertinent to other tasks to be completed by the technician, can be automatically generated for presentation to the technician while on site, for example, by an automatic review of database records associated with his prior training and experience, or information about the location, the device, the customer, or other potentially relevant information, as discussed further herein. Such systems and methods are discussed in detail hereinafter.

The request for service can be provided by a user or by a computer, such as by via an electronic notification to a system. In this regard, a person needing service (e.g., a customer, homeowner, equipment owner, etc.) can order service via an electronic order form operational on a mobile device, computer, or the like. A request for service can also be generated by the office or administrative operations of a company with which the technician is associated, such as with his being an employee or contractor therefore. Alternatively, the request for service can be provided directly by a user, such as by a person needing the service or by a person who is notified of the need for service by the person needing service (hereinafter "customer"). In this regard, the customer can contact (e.g., telephone, message, etc.) the technician directly, or she can place a service order with someone associated with the technician or via an automated call center.

The request for service at a customer location can include a request for service of at least one machine, device, or system. The types of machines, devices, or systems for which service can be requested are expansive. In this regard, the machine or device can comprise a commercial or residential heating and air conditioning system ("HVAC"), an appliance (e.g., refrigerator, washer/dryer, etc.), plumbing systems or components, electrical systems or components, irrigation systems or components of vehicles (e.g., car, truck, locomotive, aircraft), motors, industrial machinery, commercial kitchen equipment, and the like. The machine, device, or system repair request can be made by specific identification thereof, such as by make, model, serial number etc. Still further, a more generalized identification can be made at the ordering step, such as when a customer indicates that the HVAC system having a specific brand name (e.g., Trane®, Carrier®, etc.) at her residence needs repair, without providing more specific information about the system. In some aspects, the person requesting service (e.g., a customer) can be prompted to provide images of the subject machine, device, or system to the technician directly, once the technician is identified, or to as part of a user interface associated with the request for service. The user can also be prompted to provide images of the data plate, for example, which will comprise the machine's serial number and other machine- and manufacturer-relevant data. The user can also be prompted to acquire images around of the area surrounding the machine, device, or system as part of the request for service process. Additional information (e.g., address for service, contact information for requester, etc.) can also be provided as part of the request for service. In some aspects, images and/or video provided by at the ordering step can be analyzed by image processing methodologies and/or transcription of videos as discussed hereinafter. For example, an image or video uploaded by a customer can be analyzed by the systems herein via computer vision techniques to identify content therein, such as serial number, barcodes, QR codes, etc., where such information generated from images or video can be used in the selection of a technician for dispatching to the customer location. A video or audio from the customer can be transcribed for population of one or more database fields in a service call order form or the like.

Upon receipt of the request for service at a customer location, a review of a database comprising information about a plurality of technician profiles, such as by a query, can be conducted to match a technician having the skills or training suitable for completing the task for which the customer service order was generated. The technician can comprise information about each of the technicians that are dispatchable to a customer location and/or who might need training in one or more skills associated with the repair or servicing of a machine, device, or system at a customer location. In this regard, the database having the technician information therein can incorporate information about machines, devices, or systems for which the technician has previously received training and/or for which he has obtained experience working thereon.

In accordance with the present disclosure, the systems and methods herein comprise a technician database that stores technician profile information, including, without limitation, information pertaining to the skills or experience that a technician has acquired as of the date his database record is reviewed for potential matching with skills appropriate for addressing the machine, device, or system that is the subject of the service request. For clarity, the machine, device, or system that is the subject of the customer order can be referred to as the "first machine, device, or system" and another device, system, or machine can be referred to as the "second machine, device, or system." Additional machines, devices, or systems can be present at a customer location, and can be referred to individually (e.g., third, fourth, fifth, etc.) or collectively (e.g., plurality or two or more).

Information about a technician's skills, training, characteristics, and attributes can be populated in an individual technician profile in the technician profile database. The technician profile can also include information about the number of service calls the technician has made, whether or not such service calls are for the first machine, device, or system, the types of machines the technician has worked on, ratings or quality scores achieved by the technician, total years working in relevant service industries, training courses completed, among others.

Still further, the technician database can incorporate information relevant or related to one or more qualifications that each technician in the database may hold as of the date he is assessed for matching with a service request. For example, "qualification" may represent a level of competence, experience, and/or facility with a particular machine or device, such as with a machine or device of a specific identity, such as a model number thereof (e.g., an HVAC system of a specific model number). This is referred to herein as "machine, device, or system-specific qualification." Qualification can also represent a level of competence, experience, and/or facility with a specific brand of a machine, device, or system (e.g., Trane® HVAC products). This is referred to herein as "machine, device, or system brand-specific qualification." Qualification can also represent a level of competence, experience, and facility with a class of a machine, device, or system. This is referred to as "machine or device class-specific qualification." A technician who is listed in the technician database as having a class-specific qualification can be expected to have competence, experience, and faculty with a specific brand and specific type of machine or device, but not necessarily vice versa.

A technician can be associated with a plurality of competency qualifications. The database records associated with each technician are configurable to allow such qualifications to be updated from time to time with additional qualifications. Such database records can further be configurable to be queried as appropriate in the implementation of the systems and methods herein.

Some skilled trades may require certification by a governmental or trade organization, such as a state regulatory body or trade association. In some situations, novice or "junior" level skilled tradespersons may work in an area for some tasks that may be required for a machine, device, or system, but other tasks may need to be completed by technician who is licensed or certified by a government or trade association. For example, a novice or junior-level electrician can perform some electrical work at a customer location, but he may not be allowed to work on some tasks or a duly licensed technician may need to sign off on his work at completion to ensure it was correctly completed.

Qualification may also represent a level of competence, experience, and faculty in a relevant area to which broader skills may be relevant, such as plumbing or electrical, soil engineering, interior design, and so on. A "general contractor" is an example of someone who might possess a number of skills that are relevant to a residential construction, for example. A technician with this qualification may not possess an expertise in specific aspects of construction, but who can nonetheless suitably address issues that might occur at a customer location. Yet further, someone with an "electrical contractor" qualification may possess broad skills, usually with appropriate licensing, in electrical matters, but may not hold skills beyond the electrical area. Both "general contractor" and "electrical contractor" would be referred to as "field specific" qualifications, however, they would have different meanings in context. General use of the term "qualification" in relation to technicians is intended to include system- and field-specific qualifications, as well as other qualifications, unless otherwise noted.

In some circumstances, a technician may be required by law, regulation, or customer preference to be qualified by way of certification, licensure or the like. For example, in many states, HVAC technicians are required to obtain professional licensing before they can begin work. Accordingly, the technician database can also optionally include information about such licensing for the technicians. In further implementations, the certification/licensure information can be configured to incorporate expiration dates, fee requirements, or continuing education requirements and notifications associated therewith can be provided to one or more of the technician, his supervisor(s), or anyone else for whom such information could be relevant. If applicable, a technician's certification/licensure can be removed from the database if the notification or flag is not addressed. Operational aspects of the database records can also optionally be configured to automatically query license/certifications from relevant data repositories, such as public or private regulatory authorities.

Still further, public records can automatically be queried to ensure that technician does not have a negative history, such as an arrest record, that could present a problem to acceptability of that person to some customers. For example, a homeowner may not want a technician who has been arrested or convicted of a crime to have access to her home. Persons on sex offender registries may be prevented by law from being present in certain locations, such as schools. Some businesspersons may not wish to have a technician who has a poor credit history to have access to certain parts of their businesses. By periodically querying the public available criminal and civil court records and updating the technician database appropriately, as well as the publicly available financial record databases (e.g., FICO® scores, etc.), each technician can be qualified by optional criteria generated by one or more of the customer, the technician's employer, or by governmental or regulatory bodies. Notification of the absence of such negative histories as defined by a circumstance, can serve as a further type of qualification of a technician that can be queried from the technician database.

In some implementations, a preassessment can optionally be generated for a technician who has been identified as qualified from a review of the technician database, Such "preassessment" can comprise presenting one or more questions relevant to the identified machine, device, or system of interest and servicing thereof to validate the identified qualification. As would be appreciated, such presented questions will be pertinent to the customer's request for service. The questions presented can be in the form of a quiz, game, or the like that can be deployable on a mobile device. Should the technician not suitably answer the presented questions, that technician can be deselected for dispatch to the location, and the technician's database record can be updated. In further aspects, technician can be presented with training materials relevant to the machine, device, or system of interest, as such training materials are described hereinafter. Once the training materials are presented to the technician, he can be further tested for competence prior to qualifying him to service the machine, device, or system.

Once at least one qualification is matched, and optionally validated, for at least one technician skill associated with a first machine, device, or system in need of servicing by a customer, the at least one technician having such associated skill as determined from the technician database can be dispatched to a first customer location where the first machine, device, or system is located. Such dispatching can be immediate or it can be scheduled for a time in the future. The customer can be notified of such immediate or scheduled dispatch via phone, text, etc. The customer can optionally provide a response to the notification confirming, declining and/or requesting another date/time. Alternatively, the customer can be provided with a plurality of scheduling options, and the customer can be prompted to select one or more of the provided options, and such selection can be incorporated into the scheduling and dispatching of the technician. A confirmation of date and time, such as a range or window of times, can be provided to the customer.

Upon arrival at the customer location, the technician can commence servicing of the device, machine or system that is the reason for the customer's service call, that is, the first machine, device, or system in need of servicing. While the technician was dispatched to the customer location based upon the customer's identification of an identified problem associated with the first machine, device, or system, the customer may not have correctly identified the problem. As such, a first action by the technician can be to generate a diagnosis of the machine, device, or system in need of servicing. For an internet-enabled machine, device, or system, such diagnosis can be via communication with a network or directly with a device operated by the service person. For non-internet enabled machines, devices, or systems, the diagnosis can be conducted by the technician's physical examination thereof. As discussed hereinafter, the technician may be assisted with diagnosis via training materials that can be provided by a training module.

In a further aspect, information about the machine, device, or system can be incorporated in a machine, device, or system database that is searchable and retrievable as-needed for the generation of context-based information that can be pertinent to either or both of repair of the machine, device, or system or in the training of the technician. This information is context-based "condition or status information" about the machine, device, or system. Yet further, the context-based information can be associated with the location thereof, the customer, or other information that might be pertinent to the technician's efforts at the customer location or in his training. Alternatively, the context-based information can be generally associated with a type or brand of machine, device, or system. Yet further, the context-based information can be associated with both specific and more general information.

With regard to context-based information about the condition or status of the machine, device, or system, the database may incorporate specific information about the performance or behavior thereof as a function of age, conditions, etc. As an example, the database may incorporate information that a specific machine, device, or system has a record of failure when subjected to temperatures and humidities above a certain level. The temperatures to which the machine, device, or system has been subjected to can be retrievable based upon GPS location thereof by querying of weather records associated with that location. If records indicate that the machine, device, or system has been subjected to conditions that would indicate failure of an aspect thereof, the technician can be prompted to perform a diagnosis and/or service or repair of that component. On the other hand, a machine, device, or system that has not been subjected to such deleterious conditions may not be subject to such failure. In this case, the training materials or other information provided to the technician can note the opportunity for failure under certain conditions, but also that the failure need not be diagnosed under the context-specific conditions presented to the technician.

Still further, the technician can be presented with context-based information about the customer and/or the location. In this regard, if it is known that the customer is unlikely to be diligent in servicing a machine, device, or system (e.g., replacing an HVAC filter, putting oil in a machine), the technician can be prompted to diagnosis situations relevant to such issues. As a further example, the searchable and retrievable database can include information about the location where the machine, device, or system is located at the customer location. If that location is pertinent to a known or anticipated failure point, the technician can be provided with information, such as diagnosis instructions or training materials associated therewith.

More generalized, but still contextual, information can be also be provided from the searchable and retrievable database. For example, if it is known that a certain brand of machine, devices, or systems of an era or type are subject to failure and/or are likely to need repairs, the technician can be provided with pertinent information. In this regard, some manufacturers are known to have acquired parts from certain suppliers that might later be subject to recalls or that are more likely to fail.

As would be appreciated, such context-based information that can be provided to the technician in real-time and on an as-needed basis can operate as a proxy for the experience of a senior level technician who has gained context-specific knowledge about specific or general matters as a result of time spent in the field and/or as a result of lengthy and expensive training programs. That is, experienced technicians often "just know" or are otherwise able to predict what might be wrong or likely wrong with a machine, device, or system that they are presented with for servicing or repair. For example, they may have had to repair a number of a type of machine, device, or system that is located in a hot and humid area over the years, whereas fewer have needed to be repaired in locations that are cooler and less humid. This experience gained over years in the field can operate as a knowledge that allows a traditionally-trained technician to do his job efficiently and effectively. However, as noted, the relative dearth of experienced technicians in today's environment makes it less likely that a technician dispatched to a customer's location will have the level of context-based information that emanates from experience and/or substantive training. The context-based information acquirable about the machine, device, or system, the customer location, the location where the machine is located, the brand etc. can enhance the effectiveness and efficiency of a technician at a customer location, as well as in delivering to him relevant training opportunities, even though he may not possess the experience that is typically associated with a technician of the competency needed to work autonomously in the field.

While deployable in conjunction with the training material identification and delivery processes discussed elsewhere herein, such context-based information about machine, devices, or systems, locations thereof, conditions to which subjected, customer details, general brand information etc. can be useful by itself, for example, in selecting, dispatching, and managing the work of technicians for customers, predicting condition states or repairs needed for a machine, device, or system known to be at a customer location, or any other use case where such context-based information can add value.

Upon generation of or confirmation of a diagnosis for the machine, device, or system, the technician can be provided with instructions, videos, etc., that is "training materials," associated with the first machine, device, or system to facilitate servicing thereof, again as such training materials are described in detail hereinafter. However, since the technician was ostensibly qualified to work on the first machine, device, or system prior to dispatching to the customer location, such instructions, videos, etc., can be optional for the technician when he is working on the issue that premised the service call in the first order. Still further, the technician can optionally confirm that he is qualified to work on the first machine upon arrival at the customer location. Also, should the technician find that he does not have the necessary skills to work on the specific aspect of the first machine, device, or system when after he performs an operational diagnosis thereof, he can provide a notification via interaction with a mobile app, voice, text, email, or the like. Upon such notification, the technician can be provided with training materials to assist him in completing the diagnosed problem. Information regarding such lack of qualification, and any actions relevant thereto, can be incorporated into the technician's database record. Yet further, the technician can also be provided with remote assistance via live interaction.

As part of the diagnosis, the technician can generate images or videos of the first machine, device, or system. Such images or videos can be entered into OCR and transcription processes as discussed hereinafter. The information from such OCR and transcription processes can be entered into database information along with other information associated with the first machine, device, or system, such as text or video information generated by the technician. The technician can be directed via instructions or the like to generate images or video of various aspects of the first machine, device, or system, such as the branding, data plate, model number, serial number or the like. Direct input of information can be via typing, voice, or selection of one or more options from a screen. With regard to the latter, if the technician inputs a brand name for the machine, device, or system, options can be presented to him for the model number, serial number, etc. associated therewith. Such information can facilitate the providing of information to the technician associated with the machine, device, or system. The systems can be configured to elicit information for the database in the form of a workflow.

In a significant aspect, the systems and methods herein comprise identifying, at the customer location, one or more additional machines, devices, or systems while the technician is present at the first customer location. In this regard, the technician can review the customer location to identify one or more additional machines, devices, or systems located therein. Such one or more additional machines, devices, or systems can comprise, for example, appliances, HVAC systems, plumbing or electrical componentry, among others. To identify such additional machines, devices, or systems, the technician can be notified via text, email, phone, etc. as a reminder for him to conduct such identification while on site.

Alternatively, a camera can be configured to acquire photos or videos of the customer location, the system can be configured to automatically identify additional machines, devices, or systems present at the location. The camera can be included in a mobile device held by the technician, or the camera can be a separate device worn by the technician while on duty.

In some aspects, one or more additional machines, devices, or systems can be identified automatically from the images or videos and information associated with such machines, devices, or systems can be retrieved from a database of information, such as is retrievable from the machine learning processes discussed herein. Still further, the technician can be prompted to provide additional information about each of the imaged one or more additional machines, devices, or systems, such as by inputting information associated with the machine, device, or system, such as brand, data plate, serial number, etc. In some aspects, the technician can be prompted to generate additional images of the machine, device, or system itself or of one more areas at the first customer location.

In further aspects, a determination of whether the technician has a skill set suitable to service one or more of the additional machines, devices, or systems can be made by querying the technician database information to compare a list of the technician's skills or certifications with skills, talent, or certifications associated with one or more of the additional machines, devices, or systems identified at the customer location. If such determination indicates that the technician does not hold a skill, talent, or certification appropriate to service or repair the one or more additional machines, devices, or systems, the technician can optionally be presented with training materials associated with one of the second machines, devices, or systems on his device. The inventors herein have determined that provision of such a real-time training opportunity can facilitate, and even accelerate, the ability for a technician to obtain training, especially given the reduced opportunities for on-the-job and/or apprenticeships in today's work environment where there are far fewer experienced technicians who can provide the training opportunities necessary for a less experienced technician to become broadly competent in servicing a variety of machines, devices, or systems that might be in need of servicing at that customer location, as well as other customer locations where such identified machine, device, or systems may be present.

In some circumstances, the technician may be dispatched to the customer location with the expectation, based upon review of the technician's database record and/or his own understanding of his skill set, to find that he is, in fact, not fully capable of servicing or repairing the first machine, device, or system for which he was dispatched to that location. For example, if the customer's description of a problem indicated that a fairly simple repair or service was needed, a less experienced technician might be dispatched to the location. However, if the technician arrives at the location to find that the necessary effort is more complex than he is prepared to handle, he can be provided with training material and/or remote assistance suitable to address the first machine, device, or system in that visit. Typically, the inability of a dispatched technician to complete a repair or service when he arrives at a location would generate a need for a second visit; however, the ability to deliver training or remote assistance can substantially eliminate the need for more than one service call for a single request for service or repair of a first machine, device, or system at a customer location.

To facilitate a training opportunity presented at the first customer location, the technician can be instructed to review the identified machine, device, or system of interest while at the site. Such review can be conducted while a tutorial is being presented to his review, where such tutorial is via video, image, or written material. Still further, information associated with the technician and his skills in relation to the identified machine, device, or system can be stored. Such stored information can be retrievable to provide a training opportunity for the technician at a location and time that is subsequent to the service call for the first customer location, for example, in a designated training session for the technician that is scheduled for work hours where he is not on a service call. In this regard, the technician's training can be curated to better align with potential customer service or repair needs that can occur in the future.

As would be appreciated, the ability to identify machines, devices, or systems for which a technician may not hold competence in servicing or repairing that is owned by someone that is already a customer of the service company with which the technician is working can be beneficial, at least because it can be better ensured that the service company will be able to deploy technician to that customer's location when a service call is made at some time in the future. Moreover, the service company can gain valuable data about what machines, devices, or systems are present at the customer location, where such data can have utility for service plan offerings to that customer, among other things. Further uses of data acquired of machine, device, or system data are discussed further hereinafter.

As a non-limiting example of the training, a technician could be dispatched to the customer location to repair a Trane® HVAC compressor for which he has been determined via querying of the technician database to possess the necessary skills and, when necessary or requested, state licensing to allow him to accurately complete the repair. While at the location, however, he identifies commercial refrigeration equipment that, while not the subject of the current service call, could be a reason why a customer service request could be generated in the future. As noted previously, he can be prompted to generate photos or videos of the first customer location, or the photos or videos can be automatically generated while he is working on site via a camera. If it is determined that the technician does not have a skill set that is suitable to service or repair the identified machine, device, or system—here the refrigeration equipment—while at the location or at a later time he can be presented with videos, service manuals etc. associated with that identified machine, device, or system of interest. Such presented training material content can be followed by an assessment that can determine whether the technician successfully learned the presented training. If so, his technician profile can be updated. If not, information associated with the lack of mastery of the required skills can also be included in his technician profile.

A further aspect of the disclosure herein comprises generating and facilitating the delivery of training material content to a technician in need of training in one or more skills associated with his role as a technician. In this regard, the methods herein can enhance the ability to deliver not only the type of training that a technician may need at a particular time, but the methodology herein can also allow such delivered training material to be aligned with a learning style of the technician. In the context of pedagogy, the term "learning style" speaks to the understanding that every person learns differently. Technically, an individual's learning style refers to the preferential way in which someone in need of training learns best, such as by how he absorbs, processes, comprehends, and retains information. Put in the context of a technician in need of training, when learning how to service or repair a machine, device, or system, some would understand the process best by following verbal instructions, while others would learn and retain a skill better by physically touching the machine, device, or system during training. Individual learning styles depend on cognitive, emotional, and environmental factors. It is recognized that for learning and skills to be properly transmitted for retention and to develop competency, learning style information for a learner should be incorporated in the selection of training materials. The ability to better match training materials with a technician's learning style can be particularly important in the framework of today's work realities.

Traditionally, learning resources for training of technicians have been provided in both on-the-job and in classroom settings. Due to the lesser availability of on-the-job training opportunities today, classroom training may be thought to be the only practical way to provide a new technician with training. This can be problematic for at least two reasons: 1) an investment must be made by the employer and/or the student in the training, as it is often several months or even years before the technician can obtain the necessary training to be allowed to operate in the field by himself, with that investment being lost if he does not finish the training or leaves for another, possibly higher paying, job once the training is completed; and 2) the reason why many people become technician as opposed to seeking multi-year college education may be because they were not well-suited personally to learning via reading materials and sitting in a classroom, thus reducing the effectiveness of training using the approach 1). In other words, the likely training pathway for a someone who may otherwise be inclined to enter the technician profession today may, in fact, be dissuaded from entering the field because they will be required to obtain training in a manner that does not suit their learning style.

To counter such negative incentives, the inventors herein have developed training methodologies that can be better suited for those persons who would be inclined to work in the technician profession, but who would otherwise attain job satisfaction as technician. One aspect of the present disclosure allows the learning style of a technician to be included in the delivery of training materials to him. Another aspect of the present disclosure allows the delivery of selected training materials to be tested for effectiveness in providing for providing the needed training to the technician. Such effectiveness (or lack thereof) can be incorporated into one or more information sets that can be used in the delivery of training materials to the first technician in a subsequent training event or in delivery of training materials to a different technician in need of training.

Moreover, while there is a dearth of experienced persons to impart training to new technicians today, there exists a huge number of potential training resources potentially available to provide training material to them. However, these resources are largely uncurated, and many, if not most, will be ineffective to impart the body of skills needed for a new technician to achieve mastery in an area, especially when learning styles of the technician are relevant to ensuring that the technician actually learns and can retain the needed skills. The methods herein provide a needed way to effectively select and validate the effectiveness of the body of training materials available today, such as videos available in online video libraries such as YouTube® in imparting needed skills to a technician in need of training. In short, the present disclosure provides methods to provide technicians with a "personal assistant" or mentor in real-time while he is at a customer location to which he has been dispatched.

Rather than having service company personnel, such as managers or supervisors of the technician, define or select what available training materials to be delivered to the technician via a training module, the present disclosure provides needed methodologies to identify, validate, and improve the delivery of training materials to technicians in need of training, where such training is directed to one or more machines, devices, or systems of interest. Accordingly, the present methodology can reduce the subjectivity involved today in selecting training materials available from online resources today by incorporating a machine learning component associated with a training module. When properly configured, such machine learning systems can allow improved creation, selection and deployment of training materials to a technician in need of training. To this end, information generated from the methods and systems herein can allow the training module to learn and improve upon training materials created and selected for delivery to technicians in future training events.

Such machine learning systems and methods can be enhanced with the incorporation of context-based information about the machines, devices, and systems, customer locations and behaviors, brand information, etc. as discussed previously. To this end, the machine learning systems and methods can be trained to provide predictions of service call needs, failures, the amount of time it is likely to take for a technician to complete a service or repair, and the like.

In some implementations, the effectiveness of delivered training materials for training of a technician can be assessed. As more technician assessment data is collected, ineffective training materials can be "weeded out" and only the best and most optimal training materials remain in selectable from the training module for delivering to technicians in need of training. Still further, the systems and methods herein can allow training material curation to be conducted substantially automatically. New training materials can be added to the body of resources available from the training module from which the training materials can be selected, however, such new materials can also be subjected to validation via assessment after a technician is exposed to them to ensure that these comprise the characteristics necessary to successfully impart knowledge to a technician in need of training.

The present disclosure contemplates a wide variety of training material content being available on an as-needed basis to a technician in need of such training materials, for example while the technician is present at a customer location. For example, a training module can be configured to automatically review a database of training materials and allow the technician to select from a library that includes, for example, videos, manuals, wiring diagrams, and contact information for other technicians, such as experts who are available on call. The training module can be configured to select training material for a technician in need of training by analyzing information from the technician database, the service call, the customer, the customer location, etc.

It should be noted that the word "training" can be used expansively in some contexts. For example, a technician may, in fact, be capable of repairing or servicing a machine, device, or system, but he may nonetheless find that the efficiency of his efforts may be enhanced by refreshing his memory prior to or during a service call. He also may find it beneficial to have access to material that is directed toward a specific machine, device, or system or part of a machine, device, or system that is the subject of the service call. For example, he may need to refresh his recollection on a complex wiring diagram for a machine, device, or system, even though he has been certified as an "expert technician" thereof. In this case, he does not need "training;" rather he can accelerate his efforts at the customer location by referencing the wiring diagram to move his work along more smoothly.

The training module can prompt the technician who is at a customer location to identify a topic associated with a machine, device, or system present at the location and search for one or more information types indexed with that topic in a knowledge library. A plurality of information sources can be returned from the search. The technician can select one or more of the information sources for review while at the customer location. The information sources can be indexable and retrievable automatically via labelling of the information sources in a manner that is relevant to the search context relevant for a technician. After reviewing the content, he can provide a rating for the returned content. For example, the technician can provide a rating for a video that the provided content gave him good content, but that the production quality was not good, or that it was too long. Generation of a database of rated training content can facilitate generation of a technician-relevant database of information that is retrievable by a technician while at a customer location. New content can be added to the database from time to time, and such new content can be rated by the technician after use thereof to ensure that such added material is suitable for continued use.

In a further aspect, prior to a delivery of training materials to a technician as a result of a query made by him, an assessment module can be configured to assess each technician's skills competency gaps using real-time data from pre-assessments and/or from retrieving information from the technician database record for each technician, wherein such retrieved information can be compared to a skill or skill set needed to service or repair a machine, device, or system of interest. Such identified skills can be imparted in one or more training events in which training materials are selected for delivery to the technician in need of training via the training module. The assessment information can be processed by the training module to provide the technician with a personalized set of training materials directed toward addressing one or more skill gaps in a training event that he has been determined to possess, whether in general or as specific to a machine, device, or system of interest.

For example, a novice technician can be provided with training materials that are rated or ranked as more "remedial," whereas a more senior technician can be provided with materials that are rated as more "advanced," or that are intended to provide "refresher" information for someone who has already been trained on a machine, device, or system associated with the training material. In some aspects, training material can automatically be presented to the technician in conjunction with his dispatching to a customer location. In this regard, one or more training materials can be delivered by a training module when a technician is dispatched to a customer location. The technician can be required to review the delivered training material prior to or during a servicing or repair of the machine, device, or system, or such review can be optional. A notification of the technician's action in relation to the provided training material can be generated, and the technician's database record can be updated as to that review.

In some implementations, it could be beneficial to incorporate assessment information in the selection of training materials for the technician. This can enhance alignment of training materials delivered during a training event with the subjective characteristics associated with the technician in need of training. For example, if a technician is determined to have a learning style that is better suited to instruction that elicits his feedback during instruction, as opposed to a passive engagement with training material content during delivery thereof, the training module can selectively present him with training materials that require his active participation while the content is being presented. Such passive content may be a video instruction, whereas active content may be a game or feedback elicited during pauses in a video, as illustrative examples.

The assessment module can assess a technician in a first skills assessment and in second skills assessment, wherein the second skill assessment is conducted after a training program is provided to the technician, wherein at least one skill associated with a repair or service of a machine, device, or system is provided to the technician via a training module. Such associated skill is a "skill of interest." When the first skills assessment is different from the second skills assessment in relation to the skill of interest, the difference in skills assessments can be attributed to a learning experience provided to the technician, wherein the learning experience is associated with a skillset needed for the technician to service or repair one or more machine, device, or system. The information about whether the delivered training material was appropriate to impart the identified skills gap to the technician can be included in one or more information sets used to deliver training materials to that technician or other technicians in subsequent training events.

As mentioned previously, a variety of training resources can be presented to the technician via the training module. For example, the technician can be provided with written material, videos, virtual characters, games, or the like. Such presented resources can be identified for the technician individually to provide a personalized training program or training resources can be associated with a group or class of technician's similarly situated in experience.

As would be appreciated, selection of the training material automatically via the training module can be useful to manage the content and amount of training material provided to a technician, a group of technicians, and/or a class of technicians over time. As used herein, a class of technicians can be a collection of technicians that entered a company or program at the same time such as "hired in January 2019," whereas a grouping of technicians can be a ranking or level for a group of technicians, such as "novice," "intermediate," "expert," "six months on the job," or the like. Database records for such classes or groups of technicians can be incorporated into the database records for use in the selection of technicians for a service call as discussed elsewhere herein.

The training module can be configured to store information related to the selection and delivery of the training material, as well as how such material effects (or does not effect) the skills imparted to the technicians in relation to one or more skills gaps. Such material can be included in one or more information sets to facilitate additional training material selection and assessment thereof for a single technician, group of technicians, and/or a class of technicians.

While the automatic selection of training material via the training module can be effective in delivering training material to a technician, in some implementations, training material can be manually selected from a library of materials, such as a technician himself or by a manager or supervisor of a technician. In this regard, a technician, manager, supervisor etc. can review a list of training materials from a library thereof to identify one or more training materials that are returned via a search engine or the like. For example, if a user identifies an HVAC system as a subject matter in which he needs additional training, a technician can perform a search in a search engine configured for searching such training material to identify one or more training materials that have been indexed as providing the learning material of interest as content therein. In some aspects, training material content selection can be enhanced with suggestions made automatically by the computer. Such automatic selection can be made via use of information sets that are generated from collection of information about the training material itself, the effectiveness of such material in training technicians as determined, for example, by the assessment module, as well as rankings and other information provided by technicians or other users of the training materials.

Resource rating and collection of feedback, such as by ranking, ratings, badges, etc. can provide insights of a technician's appreciation of the training materials delivered to him. A rating value and rating count may be used to identify popular and trending resources and recommend them when aligned with identified learning objectives for the technician, a group of technicians, or a class of technicians. Also, correlative analytics can be applied to resource ratings, resource usage, and assessment results to identify resources that may be more effective than others.

With regard to the rankings and other information provided by users, in some aspects, training material can be associated with rankings, ratings, etc. that provide one or more indications to a user of the quality or value of the subject training material as rated by the technician. Such rankings, ratings, etc. can be further associated with a user, group of users, or a class of users. Yet further, the rankings, ratings, etc. can be associated with the author, moderator, source, etc. for the training material. Such information can be incorporated in one or more information sets associated with the training materials themselves, and the source of the rankings, ratings, etc., among other things. It follows that training effectiveness can be enhanced when the training material provided to a technician can be more specifically tailored to his learning style(s) and personal preferences.

Learning motivators can include curiosity-based story exploration, a countdown clock timer, clues, unlocking tasks, obtaining points, leveling, progress meters, and badges can be provided in conjunction with one or more training events. Badges or other symbols can accumulate to a technician across multiple training events and can be associated with completion of training events and/or successful skill mastery as shown by one or more assessments. In some aspects, accumulation of a defined number and/or type of badges can be incorporated into a certification process for the technician, in some circumstances.

In some aspects, user or technician selection of training material content, as well as rankings, ratings, etc. that he generates in conjunction with his review thereof, can be configured for use in subsequent searches for training material content appropriate for a particular technician, group of technicians, or class of technicians. Such information can be used to enhance presentation of training material content to a technician via the training module with a goal of improving the form and/or content of the presented training material in context.

For example, a video incorporating information about repair or servicing of an HVAC system can be associated with a rating of "excellent" with regard to its content for the purpose of training, but with a "poor" rating for its production values or the person who is providing the instruction in the video. Still further, a video can be rated as "excellent" for its content in relation to providing instruction to a novice technician, but only "fair" or "poor" as to its content for a more experienced technician. When a technician or other user searches for content, such ratings can be presented to him in conjunction with a plurality of training materials, where such plurality of training materials are also associated with rankings. The technician or user can then select one or more videos from the plurality based, at least in part, one the provided rankings. In some implementations, the technician or user can generate one or more criteria to define the search to better return training material results that suit his needs. Such search criteria can be recorded, so that subsequently delivered training materials conform to such generated criteria.

In some implementations, the training module can be configured to provide a technician with training material in the form of videos having content that is appropriate for imparting one or more skills associated with a machine, device, or system. The training module can be configured to automatically select one or more videos that incorporate appropriate training content to address an assessed skills gap in the technician. Such automatic selection can be in accordance with a search configured to return one or more videos having characteristics appropriate for the technician's learning style and needed skills, among other things. The accuracy of the inputs that defined the selection of the video itself as a form of training material can be validated, at least in part in an assessment of the technician's performance on an assessment (e.g., a test or game where performance can be measured) that can be given after completion of the video.

For example, when the assessment module identifies that a skills gap exists with the technician, and that the learning style of the technician is appropriate for learning by video instruction, the training module can be configured to automatically select a video from a video library that includes information associated with addressing the technician's identified skills gap. The selection can be facilitated by use of rankings, ratings, etc. associated with the video, as well as for identifiable characteristics of those who have generated the ratings.

If skills assessment determines that the technician who learns well via video instruction has a skills gap that reduces his effectiveness in servicing or repairing an HVAC system generally, he can be provided with one or more videos associated with HVAC repair generally. If, on the other hand, the technician is assessed to possess a skills gap for a particular aspect of the HVAC system (e.g., compressor, duct work, etc.) or a particular system brand (e.g., Trane®, Carrier®, etc.) he can be presented with one or more videos associated with these specific topics. His comprehension and retention of the delivered training material can be assessed after completion of the training material, as discussed elsewhere herein, and a determination can be made of whether the delivered training material(s) provided the desired skills gap improvements for the technician.

Still further, one or more characteristics of the persons who generated the ratings of the training material can be compared to characteristics of the technician in need of training. For example, if there is information that a person who generates a rating or ranking of a video that information can be used by the training module in selection of a video for the person in need of training. Since some of the characteristic information needed to match characteristics may comprise personal and confidential information, comparison of characteristics could be restricted to a single company database where information about the person who rates or ranks training material is maintained in the same database, such as an human resources database within a company. Such compared characteristics can be information such as educational level attained, general information about reading and mathematical capability, and learning style, among other things. Again, an assessment of the technician after the selected training material is provided to the technician can allow a determination of the appropriateness of the selected training material in providing the needed training.

As would be appreciated, selection of the training material automatically via a training module can be useful to manage the content and amount of training material provided to a technician, a group of technicians, and/or a class of technicians over time. In this regard, the training module can be configured to store information related to the selection and delivery of the training material, as well as how such material effects (or does not effect) the assessment of the technicians in relation to one or more skills gaps.

In some implementations, a technician's learning style may indicate that his learning and retention can be enhanced by incorporating a gaming aspect to the delivered training materials. In this regard, the continuous engagement provided by inclusion of gaming features can improve skill learning and retention by providing useful incentives for a technician to play through the game, and naturally learn the material as the technician advances through the gaming environment. To this end, some technicians can better retain the material being taught when it is presented in the form of a problem to be solved, or with the presence of a memorable achievement or reward that is provided when he can demonstrate via interaction with the system that he has mastered the materials. Furthermore, incorporation of training material in gaming aspects can allow different types of teaching materials (e.g., written materials, virtual characters, videos) to be integrated into a gaming framework.

Still further, some technicians may learn well by video instruction, but may not perform well in standard testing conditions. In this regard, an assessment of the training of the technician after review of the video can be conducted via a game wherein the performance of the technician can provide information of whether the technician possesses the skills intended to be conferred by the training material.

In some implementations of the gaming aspect, the training module can be configured to deliver training materials in the form of a game, or with one or more gaming features associated therewith. As one example, a technician can be presented with training materials configured as a task (e.g., repair of a machine, device, or system in a location) that includes a virtual presentation in which the technician is instructed to perform a virtual task that is associated with a machine, device, or system of interest. In a further implementation, the technician can be given a score or rating for his efforts in completing the virtual task. The scenario can comprise a virtual reality representation of a machine, device, or system of interest, where one or more tasks associated with service thereof can be presented as an aspect of training material. In this regard, a virtual reality version of a machine, device, or system can be presented to the technician, and he can use tools in this virtual environment to "virtually" repair or service the machine, device, or system. Still further, an interaction with a virtual character (e.g., virtual teacher or mentor) can be provided, where the technician is presented with verbal instruction that is related to a machine, device, or system of interest and/or a customer engagement scenario. Such virtual character can coach or instruct the technician during a virtual reality training scenario. Such active learning via gaming can operate similarly to a traditional apprenticeship, with the added benefits of not requiring an experienced person to be present during learning and to allow the technician to obtain training on an as-needed basis.

Gamification training can be beneficial in facilitating training because they are designed to leverage a user's desire for socializing, learning, achieving, status, and competition. Gamification training generally include a number of gamification sites. Gamification training modules may contain content including goals (e.g., watch a video, answer questions, sell an amount of a product, complete a homework assignment, run a distance, etc.), rewards (e.g., badges, points, levels, etc.), visualizations (e.g., the look and feel of the site, the look of the rewards, the information shown to the user about their progress or the progress of other users, etc.), and milestone logic (e.g., number of points required to achieve a level, number of points required to earn a badge, number of badges required to achieve a level, etc.).

In one implementation, a training module can include a scoring module that determines a score for the game based on the technician's performance in the game. Such scoring can be used in the assessment of the technician for skills gained (or not gained) as a result of delivery of training material in a training event. In another implementation, the score can be stored in the technician database in accordance with the records of the technician skills and/or can be provided to a manager etc. Successful completion of an assessment, such as in response to a test or the like, can be updated in the technician's database record. In certain implementations, the training material content delivered to him in other training events or to other technicians can be modified based on the technician's performance in the training game. Ratings or rankings about the game can be generated by a technician and incorporated into the training module for use in generating additional training materials.

When presented in the form of a game configured to impart skills to the technician, the game can be tuned or modified in response to the character of the performance by the technician. In certain implementations, the training module can increase difficulty of the game in response to a correct behavior from the technician, where such correct behavior can be inferred to be a result of learning by the technician. In another implementation, the training module can decrease a difficulty of the game in response to an incorrect behavior from the technician, thus indicating that the technician may need additional training prior to moving on to a higher skill level. Lack of skills mastery or increasing competency in relevant skills can be accounted for by presenting the technician with less or more difficult task scenarios that are designed to allow continued skills enhancement. By providing the technician with training material in the form of a game that has intentionally designed task scenarios that can be mastered according to his skills, it can be possible to accelerate skills acquisition versus more traditional training programs that are often based on structured programs that operate independently of student skills mastery and engagement. In this regard, in some implementations, a technician can attain relevant skills mastery more quickly than possible with prior art training programs.

In a further implementation, the training module can be configured to modify one or more game settings in response to the technician playing the game such that the technician is provided with a different experience each time the game is played. In certain implementations, the one or more gamification features can include virtual life, achievements, leaderboards, and virtual currency. Such incentives can enhance the engagement of the technician with needed training, as would be appreciated. The training module can also be configured to manage a competition between a plurality of technicians playing a training game, where each of the technicians can have a training program associated with their specific learning styles, skill levels, experiences, demographic characteristics, etc. In certain implementations, a plurality of technicians in need of training can be grouped into a plurality of teams, and skills can be imparted to them in a group setting via the gaming aspect. The performance of the technicians as a team and as individuals can be assessed as discussed elsewhere herein.

In some implementations, by analyzing the technician's progress on the initial goal, as well as the progress of the other technicians in the gamified training materials, the system can create content, such as a second goal and associated reward. The second goal and reward can be assigned to the technician upon completion of the initial goal and reward. In other aspects, the second goal and reward can be assigned before the completion of the first goal and reward. Generally, the aim of the second goal and reward is to maintain the technician's engagement level and to motivate the technician to achieve the second goal. In some aspects, the second goal and/or specific subsequent goals may be assigned by a gamification network system administrator and/or by the gamification network system. In various aspects, the gamification network system does not assign the technician a goal until the technician's engagement level falls below a threshold level, or the system predicts that the technician's engagement level will fall below the threshold level.

In another implementation, the methods and systems can include a help module that connects the technician with a remote technician, for example an expert who is available off-site, in response to technician input. Such on-call expertise can facilitate the availability of expertise on an as-needed basis in view of the shortage of seasoned technician in today's job market. The expert can interact with the technician in need of training with real-time video, chat, voice, etc.

The training module can be configured to utilize machine learning to learn from previous training events, technician assessments, and technician ratings of the training material. In this regard, information generated from various aspects of the technician database querying, selection and delivery of one or more training materials to a technician in need of training from a library of training materials can be used to train these machine learning processes. In addition, the performance of the technician during a training event can also be assessed, and information generated therefrom can be used to evaluate the effectiveness of various aspects of the training module operation.

The training module can be configured to include data analytics and context-specific heuristic dashboards to provide supervisors and system administrators with real-time predictive advice regarding the skills portfolio of their technicians and future learning behaviors of individual technicians, group of technicians, and the organization as a whole.

In order to provide real-time predictive advice, the training module can include data analysis that correlates the time spent to a specific training event or learning activity, such as a game or post-video review assessment. Such real-time predictive advice can be useful when a technician is present at a customer location but does not possess the skills needed to repair or service the machine, device, or system. Alternatively, he may find that he needs a refresher for the needed activity for which he has been dispatched to the customer location. By analysis of the performance of the technician for a training event in real-time, the supervisor of the technician who is not present at the customer location can gain knowledge of whether the technician can be expected to successfully complete the task for which he has been dispatched to the customer location, or whether a second technician needs to be dispatched to service or repair the machine, device, or system.

The training module can also be configured to predict training completion level based on the technician's activity compared to group averages. This may be based on machine learning techniques that aggregate past technician experience data and continually adjust when new data is received. In this regard, when the training module is configured in the form of a game, a group of technicians can participate together to achieve a specific goal or a set of related goals. The goals can include a number of tasks that must be completed by each technician in order to complete the goal. For example, a goal may require the technician to complete five tasks. The goals are generally tied to a reward, such as points, badges, currencies, levels, filling a progress bar, and the like, which indicate that the technician is working toward achieving, or has achieved, their goal. As used herein "rewards" includes recognitions.

Still further, the methods and systems herein comprise generating one or more libraries of training material, wherein the one or more libraries comprise a plurality of videos, written materials, games, audio, virtual reality materials, and augmented reality materials. Such libraries can be configured to provide training materials to a technician in need of training in a skill or task associated with the service or repair of a machine, device, or system at a customer location. The training material is selectable via a training module that can access resources that allow the training material to be customized for a specific technician, a class of technician, or a group of technicians based on a number of technician characteristics. An assessment can be generated for the technician after he completes a training event to determine whether the selected information was sufficient in delivering necessary learning to him. Operation of the training module can be modified for subsequent training material delivery if it is determined from the assessment that the technician did not obtain the desired training.

In a further significant aspect of the disclosure herein, information generated by the technician while at a customer location can be incorporated into a database of information about one or more machines, devices, or systems and the associated customer location. Such information can be useful in to provide suitable training materials for technicians associated with the one or more machines, devices, or systems, in one implementation. The collected information can also be used to populate a database of context-based information, as discussed previously. For example, the collected information can also be used to generate service programs for the customer, to predict and schedule subsequent service calls for the customer, to collect and analyze reliability information for the machine, system or device and to suggest replacement thereof when reliability information indicates that the machine, device, or system will soon reach its end of life or repairs will become too expensive.

For information to be generated from images or videos substantially without human supervision, whether unsupervised or lightly supervised, a labeled image library must be provided. Such labeled image library can be generated by providing images of machines, devices, or systems that may be encountered by technicians at customer locations, where such provided images can be labelled by a human for use. However, such a library will likely be somewhat limited given the vast variety of machines, devices, or systems that a technician may encounter. Moreover, there is an even greater variety of potentially relevant information that will be present at a customer location. Practically, there will be limited utility for an image database of machine, device, or system associated with customer locations that is pre-populated with machine, device, or system and location information. The present disclosure provides methods to generate useful image databases generated from in-person visits to customer locations. Because such image databases are generated from actual technician use cases, they can be more directly targeted to technicians.

As would be appreciated, labeling of the image information is a significant aspect of the ability for imaging information to be utilized in automatic or semi-automatic processes. Suitable labeling of the image information can be conducted by the technician at the location, via matching of database information associated with the machine, device, or system, and/or by a human reviewer. "Labeling" means manually combining a name, category, descriptive value or the like for the one or more machine, device, or system and relevant information associated therewith that can be extracted from the images. Machine learning systems from which information can be extracted from images automatically will be based, at least in part, on the ability to identify objects that are present therein without human supervision. In this regard, the machine learning systems can provide a prediction of an identity for a specific element in an image, or an "object," that can be resolved therefrom. A "prediction" is the process of substantially automatically assigning a name, category, descriptive value or the like for the one or more objects that may require at least one additional processing step in addition the prediction step whereby a generated object output can be associated with the relevant object(s) as occurring in the scene. Prediction may also refer to the act of assigning a class, assigning a labeling, labeling an object, etc.

For example, when generating images at the customer location, the technician can be prompted to input information via a workflow that requests input from him. Such input information can be matched with GPS information, customer information, and the like, where such matching can be by the computer or the technician or both. Yet further, information about the machine, device, or system etc.

A "training set" or "object library" is a collection of representations of the object with the associated labels, which in the present disclosure can be populated with information relevant to the machines, devices, or systems that may be a subject of a service or repair call at a customer location. A training set can be used in conjunction with machine learning algorithms in assigning object recognition properties and property weights, where "weights" refers to the confidence or significance assigned to a given property. Furthermore, optionally, what is commonly referred to as a "look-up table" can be used in which the attributes of a given object are used to create the association with its corresponding label. The training set may further include sub-class labels of a given object. An example of this would be the inclusion of HVAC system types for the class "HVAC." This aspect of the methodology should not be limited to only pertaining to labels, but also to other meaningful attributes or values (like material properties or common dimensions, etc.).

In this regard, images or videos of one or more machines, devices, or systems at a customer location can be generated while the technician is on site. The technician can be prompted via workflows or onscreen display to obtain specific information about an imaged machine, device, or system, such as the serial number, branding information, barcodes, QR codes, etc., as discussed herein.

When video is generated by a technician at a customer location, the technician can include narration in the video. In some implementations, the systems and methods can be configured to identify one or more key words or phrases present in a video automatically. As would be appreciated, audio from videos can be automatically transcribed using a variety of captioning software. Key words and phrases transcribed from the video can be compared to a list of relevant keywords existing in a look-up table, for example. If one or more of the identified key words or phrases occurs in a video generated by the technician at the customer location, such generated video can be indexed in the database of training materials. When a subsequent search is conducted by a technician or the like with the key words or phrases as search criteria, that indexed video can be returned in the search. Over time, such technician-generated videos can allow a technician-relevant database of training material to be generated, as opposed to relying on less context-specific indexing that occurs with video libraries currently. Such curated library may be maintained for use by a selected or managed group of users, such as in a company intranet, or the library can be made available for use to a broader segment of users, such as in a publicly accessible library.

Yet further, in some implementations, videos generated by technician at a customer location can be transcribed to generate field notes associated with the service call. In this regard, the ability to extract relevant information directly from video can facilitate the efficiency and completeness of the tasks completed and parts provided, as well as related information, in conjunction with a service call made by the technician. This record can improve scheduling and billing operations in that a more accurate record of the time spent at a customer location can be generated. In one example, the technician can be provided with a workflow that prompts him to record videos at one or more times during a service call, for example, at least at the beginning and the end of the call. He can also be prompted during the service call to provide an update as to his efforts and progress at various times during the call. The video can be automatically transcribed to populate fields in a service call report, and time information can be used to generate accurate billing information, as well as to assist in the scheduling of subsequent service calls. By allowing such automatic transcription, technician time can be used more efficiently, especially given the fact that some technician may have a lesser ability and/or interest in completing writing-intensive work requirements.

Moreover, videos generated at a customer location can be used to develop timing information relevant to the specific technician. In this regard, video time stamping can allow the technician to be evaluated to determine whether he took too long or did not spend enough time at the customer location, where such information can be included in database information for that technician. If a technician takes longer than expected to complete one or more tasks for which he was dispatched to a customer location, such extended time could indicate that he needs additional training in that machine, device, or system. If the technician does not take as long as expected on a service call, he might not be completing the required tasks appropriately, thus signaling that more training is required or that disciplinary action is needed, or that the scheduling system is providing too much time to complete the task, thus reducing the revenue available from the technician. Thus, the video aspect of the present disclosure can facilitate improvements in the quality of technician work at a customer location and/or the more efficient scheduling of work.

As noted, such generated image information for the machines, devices, or systems and any associated information can have utility in the training of technicians according to the disclosure herein. In this regard, the customer for whom the service call is being completed is, by definition, a customer of the company for whom the technician works. If follows that this customer may have a service need in the future for one or more machines, devices, or systems at that location. By recording the presence of one or more machines, devices, or systems at the customer location, technicians employed by the service company can be delivered training materials that are associated with skills that may be needed to service these other machines, devices, or systems at the customer's location. In other words, identification and recording of information pertinent to machines, devices, or systems at the customer's location can allow more purposeful identification of training materials that are pertinent not only to skills gaps that may exist for the technician, but also that are more likely to align with actual service requests that may be made by existing customers at a future time.

In some implementations it can be beneficial to obtain information about the surroundings in which the machine, device, or system is located. For example, if an HVAC system is located in a wet or deteriorating location, it could be inferred that the system may be inclined to failure or at least may need servicing more regularly. Such information can be incorporated into a database associated with customer records, such as customer relationship management system.

As would be appreciated, images taken at a customer's location can automatically be populated, and therefore labeled, with location data, as well as information associated with that location, such as the customer information available from a CRM system. Software, such as in the form of an app configured on a mobile device, can be configured to prompt him to generate images, as well as to populate information associated with the images, such as address of the location, specific information about the machine, device, or system and location (e.g., GPS information, location-relevant information such as surrounding conditions, customer information, etc.). However, in some implementations, it can be beneficial to configure the image acquisition system to automatically populate at least some of the data associated with the acquired image data. For example, when the technician images the data plate of a machine, device, or system at the customer location, such serial number can be submitted to an optical character recognition engine to allow the serial number information to be extracted from the image. For machines, devices, or systems of more recent vintage, a barcode or QR code may also be present so as to allow the image acquisition system to acquire information associated with such codes. Information associated with the images can be automatically retrieved from database records. For example, a serial number, warranty information, repair records, etc. can be associated with images of the machine, device, or system generated at a customer location.

In some implementations, information about acquired images can be generated after the technician leaves the customer location. In this regard, a human can review the images of the machine, device, or system and customer location to generate labels for the images so that useful information associated with the images can be retrieved as needed.

Yet further, the image acquisition system can be configured to automatically review the imaging information extract information about the machine, device, or system and customer location directly from the image information. Such automatic review generated at a customer location can be facilitated by comparison of objects extracted from the images using known computer vision methodologies and by comparison of such extracted objects with a suitable object library. As would be appreciated, an "object library" (also known as a "training set") means the collection of objects for which machine learning systems can be configured to predict from images information. Such objects can include any and all objects for which one or more machine learning algorithms have been trained to recognize or to differentiate. This includes subsets of sets of objects down to any level of detail. For example, an object in an image can be identified/labeled by the machine learning processes herein as an "HVAC system," or an "HVAC system located at the north side of Mr. Smith's house" or a "Trane® HVAC Model Number XYZ located at the north side of Mr. Smith's house," etc.

The methods of the present disclosure can provide location information about the object(s) as it was present in the scene and when coupled with other technologies like GPS can further be georeferenced. For example, if one or more objects of interest at the customer location include an HVAC system that was present one the north side of the customer's house, the present methodology can provide information regarding where the HVAC system was present in the scene in relation to other objects (e.g., fencing, trees, gates, etc.) and building structures (e.g., walls, windows, etc.). Inclusion of additional information from technologies like GPS can allow for georeferencing of the object or objects in a scene, allowing for their presence to be shown in mapping tools like "Google Maps". Still further, the methodology herein can be used to generate information about the orientation or placement of object(s) in the scene. For example, the distance of an HVAC system from the outside of the house can be provided so that the placement of the HVAC system relative to the customer location.

In further implementations, images—both in the form of photos and videos—generated by a technician, and related information, can be automatically distributed to other technicians and users that may have an interest in such information. For example, database information about a group of technicians may indicate that each has not yet obtained training in a particular machine, device, or system. When the technician who generates the images is a member of the same group his database record will be updated as having had experience with the machine, device, or system and such updating can trigger distribution of the first technicians generated content to others in his group of technicians, as well as the updating of their database records. Such database updating can be delayed until each other technician, independently, has reviewed the provided information and, optionally, has participated in an assessment associated with such provided information.

In further implementations, the disclosure provides methods to predict current and/or future condition states associated with a machine, device, or system of interest. A current condition state of a specific machine, device, or system in relation to various contexts can be determined for a specific machine, device, or system. Still further, the disclosure can allow the current and/or future condition states of a collection of machine, device, or systems of interest to be generated.

To this end, machine learning processes can be configured to generate a robust collection of context-relevant information for a plurality of machines, devices, or systems. Such historical information can be compared to one or more machines, devices, or systems of interest where current and/or future condition state information may be of interest. Such condition state information can be useful for machines, devices, or systems that are already in use and for prediction of a likelihood that a new machine, device, or system may require a plurality of service or repair events in use, optionally, with an prediction of an approximate time/date for such service or repair events, as set out in more detail below.

The disclosures herein can allow greatly enriched information relevant to determining a current or future condition of a machine, device, or system to be generated. To this end, a library of machine learning information can be developed and enhanced as historical data is collected as each of baseline machine, device, or system information and information, where the collection is generated from a plurality of service or repair events for a specific machine, device, or system or a collection of machines, devices, or systems. The service or repair event information incorporated in the historical information can provide actual usage data for a specific machine, device, or system or a collection of machines, devices, or systems, where such actual usage data can be leveraged to provide useful insights.

Baseline information can comprise information associated with a machine, device, or system that is generated at the time of manufacture. Such baseline information can allow parts, equipment, mechanical, and related information associated with one or a plurality of machines, devices, or systems to be tracked to determine whether and to what extent such characteristics and features may effect the operation of a machine, device, or system over time in the context of actual use. Baseline machine, device, or system information can comprise one or more of:

Type (e.g., HVAC, washing machine, garage door opener, etc.);
Manufacturer (e.g., Trane, Carrier, Daikan, etc.);
model number;
serial number;
date of manufacture; and
manufacturer-provided specifications and use recommendations.

As would be appreciated, at least some of the relevant information about a machine, device, or system relevant to the origin (e.g., pre-use information) and operation thereof at a location can be provided via an information plate or label that is typically included in a conspicuous location on or near a machine, device, or system. In this regard, images of a machine, device, or system of interest and the system can be configured to extract information relevant for a repair or inspection thereof. A technician, an owner, etc. can obtain an image of the information plate or label and the acquired image can be processed via optical character recognition ("OCR") to extract relevant information about a machine, device, or system, such as manufacturer name, serial number, manufacture date, etc. In implementations, information extracted from the images via OCR can be incorporated in a searchable database to provide information relevant to a service or repair event for the machine, device, or system. For example, information derived from the images via OCR can be compared to information in one or more searchable databases to provide specific information about the specific machine, device, or system, a collection of similar machine, device, or systems, prior repairs events, recalls, etc. A collection of information relevant to the service or repair event, such as technical diagrams, repair instructions, etc. can be delivered to a technician upon identification (or confirmation of a previous identification) of the machine, device, or system via identification of the machine, device, or system via the information plate or label.

In other implementations, a machine, device, or system may be associated with a QR code, barcode, etc. that can be imaged and a collection of information about the machine, device, or system can be returned. To this end, modern machine, device, or systems will often be associated with data for each machine, device, or system that is retrievable from a database maintained by the manufacturer, retailer, etc. In many cases, technical diagrams, repair instructions, etc. can also be automatically retrievable by QR code or barcode.

In some implementations, a serial number for a machine, device, or system can be manually input into a workflow associated with a machines, devices, or systems database. For example, a technician, owner, etc. can be prompted to identify information associated with the machine, device, or system, such as a serial number, etc. via a workflow associated with a service or repair event. The input serial number can then allow other relevant information categories to be populated for use in the processes herein.

In some implementations, an information library can be associated with object identification functionality that can allow at least some aspects of the machine, device, or system to be derived automatically from images generated thereof. For example, a specific Trane® HVAC unit can be automatically identified from images by identification of a nameplate, dimensions, and/or features visible in images generated of the HVAC.

Baseline information that is not available as collection from a database can be individually retrieved from relevant locations, such as by an API configured to populate information needed to populate the historical database. For example, technical specifications for an older machine, device, or system may not be maintained in a collected form, such as would typically be the case for more modern machines, devices, or systems. Technical specifications may otherwise be available from one or more locations, such as service or repair-oriented websites that are not affiliated with the manufacturer. To the extent such information is relevant for determination of a current or future condition state rating, the database can be populated therefore.

Baseline machine, device, or system information that is accurate/valid in the first order can serve as a framework for generation of historical information database information that can be further populated with actual usage information for machines, devices, or systems that comprise or are similar to the machines, devices, or systems for which baseline information exists.

Context-based machine, device, or system information associated with actual usage information can be generated from information acquired from a plurality of service or repair events as set out further herein. Data collectable in such service or repair events can include:
- purchase date;
- installation location (e.g., GPS coordinates);
- use relevant observations that can be made by the technician at the location including:
  - approximate amount of use (e.g., light, medium, heavy);
  - maintenance observations for the machine, device, or system or areas proximate thereto;
  - owner/user demographics (e.g., size of family, age of residents, owned or rental property); and
- information associated with one or more previous service or repair events (e.g., type of repair, parts used, technician demographics, time needed for repair, cost of repair).

Such context-based machine, device, or system information can have utility in generating more robust insights about what effects actual usage condition of machine, device, or systems may have on a current or future condition state of one or more machines, devices, or systems of interest.

Context-relevant observations associated with a machine, device, or system and areas proximate thereto can be subjectively generated by a technician at a site where the machine, device, or system is installed, and the relevance thereof can be enhanced by training the technician to use keywords that can be automatically identified from audio generated in the service or repair event. Audio can also be analyzed by a human from time to time for improvement in generating relevant subjective condition state definitions. Context-relevant observations can also be derived from video and/or image generated by a technician during a service or repair event. For internet enabled machines, devices, or systems, historical usage information may be available from each device. Diagnosis codes can also provide context-relevant usage information that can provide enriched information about a machine, device, or system or plurality of machines, devices, or systems of interest.

With regard to machines, devices, or systems that are already in use, a current condition state can be prediction, such as in conjunction with a diagnosis associated with a service or repair event. Data associated with a current condition state can be collected by a technician using the methodology discussed further herein. The current condition state information for a machine, device, or system of interest can be predicted via analysis of a specific (e.g., first) machine, device, or system information against a library of historical information associated with a plurality of machines, devices, or systems, which may or may not include prior service or repair events associated with the specific machine, device, or system for which current and/or future condition state information is of interest. That is, the machine, device, or system of interest may not have previously been associated with a service or repair event where data has been collected, however, the library of historical information can enable information relevant to the specific machine, device, or system to be analyzed to provide insights that are based upon similar usage information generated from unrelated service or repair events.

Current and/or future condition state information for a specific or a plurality of machines, devices, or systems of interest can be configured in a number of different formats. For example, the condition state information can be presented as a condition rating selected from a list of ratings. In this regard, the rating can be presented as a letter grade indicating a condition, such as A, B, C, D, F. Alternatively, the condition state rating can be provided as percentage, such as for an amount of useful life that has been expended for that machine, device, or system to date, such as 90%, 75%, 25% of life useful life remaining. Yet further, the condition state can be presented as "excellent," "very good," "good," "fair," and "poor." Pluses and minuses can be used to provide more specificity to the grade, if appropriate. Other forms of condition state ratings can also be generated, as long as such ratings are aligned with generated condition states derived for the machine, device, or system of interest using the machine learning processes herein.

It is expected that as more context-specific data is generated for a machine, device, or system, the quality of condition state information will improve. Such improvements can be further enhanced by human review of some generated information from time to time. To this end, at least some human validation of the generated condition state and other computer-generated information can be provided. If information is determined to comprise one or more errors, that information can be excluded. For example, validation of the accuracy of information can improve the predictions generated from the methodology herein.

The condition state information can be presented with a confidence level of associated with a likely accuracy thereof. Lower confidence levels can be flagged to notify a user that the condition state information may not be accurate to allow robust decision-making. Any condition state information having a confidence level that is below a provided confidence level (e.g., a confidence level of interest) can be provided to a human reviewer for analysis of one or more of specific machine, device, or system baseline information and usage information, and the historical information associated with the plurality of machines, devices, or systems.

In conjunction with a service or repair event associated with a machine, device, or system of interest, a technician can be dispatched to a location where the machine, device, or system is located as discussed in more detail herein. While there, he can visually review an individual machine, device, or system to generate a diagnosis of one or more problems in need of fixing. He can also identify any error codes delivered by the machine, device, or system and/or collect any video and/or audio data associated with performance therefore. Such review can include acquisition of specific details about the machine, device, or system, such as type, manufacturer, serial number, manufacture date, etc. Technical specifications for the machine, device, or system can also be acquired. Diagnosis information can also be derived from analysis of the audio and/or video data by the computer or a second technician that is remotely located, as is discussed hereinafter.

In some implementations, at least some information relevant to determination of a condition state of interest for one or a plurality of machines, devices, or systems of interest can be generated with information obtainable from images of the machine, device, or system conducted by a technician in a service or repair event. As would be appreciated, the machine learning library used for generating a condition state rating for one or more machines, devices, or systems can further be configured to identify machine, device, or system information directly from images, such as by analysis of name plates/label, shape, size, features, defects, problem areas, etc. For example, the systems can be configured to identify type of machine, device, or system (e.g., HVAC, dishwasher), brand names (e.g., Trane, KitchenAid, etc.), size (e.g., tonnage, capacity, etc.), age, damage (e.g., rusted areas, poor drainage, improper installation), among other things. Such machine, device, or system information can be generated by acquiring images of a barcode, QR code, etc. where such information is directly derivable as would be the case with most newer machine, device, or system.

In some implementations, current condition state information can be derived automatically by review of images and/or video of a machine, device, or system, by human review of the machine, device, or system, or a combination thereof. A workflow can be provided to a user (e.g., technician, owner, manager, etc.) that provides prompts for the collection of images and/or video. For example, a user can be directed to acquire video of the machine, device, or system, locations proximate thereto, and/or the machine, device, or system information plate/label and individual frames from the video can be used to extract needed information.

In implementations, configuration of the systems and processes herein can include identifying a collection of keywords that are relevant to one or more current and/or condition states of one or plurality of machines, devices, or systems of interest, where such condition states are or may be associated with a current or future service or repair event. Such keywords can be derivable from error codes generated by software associated with a machine, device, or system. The keywords can also be identified from knowledge generated from technician service events. The keywords can be used along with other generated information generate a current condition state associated with a service or repair event.

A human (e.g., technician, owner, manager, etc.) can input the machine, device, or system details, such as via queries presented via a workflow. Human information entry can be by text-based input, through recordings of verbal input, or a combination thereof. When the input is via verbal observations, the information can be analyzed, by either or both of automatically by a computer or by a human, to identify keywords that have been generated as potentially significant to a condition state for the machine, device, or system. For example, keywords that can be identified from verbal observations can be configured to identify type of machine, device, or system (e.g., HVAC, dishwasher), brand names (e.g., Trane, KitchenAid, etc.), size (e.g., tonnage, capacity, etc.), damage (e.g., rusted areas, poor drainage, improper installation), among other things. While the technician is present at a service or repair event location, he can make verbal observations while engaging in a machine, device, or system diagnosis. He can also provide feedback about any information that he is provided related to the service or repair event. For example, he can indicate that instructions provided to him were not sufficient and that he needs further information to complete his work. Such feedback can be incorporated into the training material aspect of the disclosure as discussed elsewhere herein.

A further improvement of the disclosure herein is an ability to obtain information about the machine, device, or system at the installation location and areas proximate thereto passively, that is, without a need for a technician to activate either a video or recording functionality while on site. In this regard, a mobile device can be configured to automatically collect either or both of image or verbal input when the technician is proximate to the machine, device, or system at a location, or any other location proximate thereto where it could be relevant to obtain images or verbal input associated with a service or repair events. The inventors herein have found that it can be somewhat common for a technician to forget to generate input, especially when he might be engaged in diagnosis of the machine, device, or system or other activities that may distract him from remembering to acquire images or make a recording of his observations. In short, it can be difficult to expect the technician to suitably multi-task diagnosis and repair of the machine, device, or system at the same time he is collecting substantive information that is needed to generate a library of historical information that is both robust and accurate. The failure of a technician to collect machine, device, or system information consistently can reduce the overall value of the historical database or at least can lengthen the time needed to generate a robust database of information.

To enhance machine, device, or system data collection from the field, the methodology herein, in some implementations, can be configured to engage either or both of a mobile device camera (e.g., video camera) and a recorder substantially without interaction by the technician. Beneficially, a mobile device can be worn by the technician in a front facing position to aid in image and video capture, however, other mobile device configurations are contemplated For example, a body camera can be affixed to the technician's shirt or worn as a headset. The mobile device can be activated by the technician such as via voice activation when he arrives at the service or repair event location, or the device can be remotely activated, such as by a signal generated from a separate device (e.g., a mobile phone app, etc.). Video generated in a service or repair event can be uploaded to a cloud server or stored on the mobile device for uploading at a later time.

A still further improvement is the ability of a remote technician to observe the machine, device, or system at the installation location in real-time via a mobile device, as well as to engage in real-time conversations with the onsite technician. In this regard, a second technician, for example, more senior technician can provide real-time assistance to the first technician. As would be appreciated, such real-time assistance can enable a single senior technician to effectively train/manage a greater number of junior technicians than would be possible under the traditional apprentice model. Information associated with the training of the technician can be analyzed to improve future training materials for the technician and other technicians, as discussed elsewhere herein. Moreover, remote view of a livestream of a service or repair event by a more senior technician can better ensure that a machine, device, or system can be serviced or repaired efficiently and effectively by someone who is more likely to be able to do so. This can both improve customer satisfaction, as well as enhance revenue for the service or repair provider by shortening the time required for completion of a service or repair event. Labor costs associated with service or repair event can also be reduced at least because highly trained, and better paid, technicians need not spend unproductive time in travel.

The technician may also be associated with a second device that is in communications engagement with the wearable device, for example a mobile phone. In this situation, information associated with a service or repair event can be generated from each of the wearable device and the mobile device. The wearable device can beneficially record audio and video, and the mobile device can include an App on which instructions can be delivered to the technician and upon which the technician can input information.

As part of each service or repair event, technician-specific information can also be collected. Such information can include technician demographic information as set out in detail herein. Such information can, for example, allow tracking of errors that may have been generated by a technician in a service or repair event, for example. Questions asked by the technician prior to, during, or after the service or repair event can be captured for analysis can be acquired. Time required for completion of the service or repair event, and other relevant technician information can also aid in the training and evaluation of a technician and can be included with other technician information.

The generated historical information derived from different types of actual use—that is, context-based use information—can be expected by the inventors herein to allow previously unknown characteristics or behaviors effecting the performance of machine, device, or systems to be identified. This is, in turn, expected to deliver enhanced insights about current and/or future condition states for one or a plurality of machines, devices, or systems of interest.

For example, a washing machine from Manufacturer 1 may work very well in locations where water is generated from a public utility, but information collected from a plurality of service or repair events may reveal that Manufacturer 1's washing machine has a high degree of failure in areas where water is derived from wells. In determining the reason for the failure of some Manufacturer 1 washing machines, but not others, use and location specific information can be analyzed. Differences in locations may indicate that failures are more likely to occur in rural locations, as indicated by GPS location data for the installation locations. Further analysis can indicate that rural locations are more likely to operate on well water. Such detailed operation information can be used to generate condition state information indicating that a Manufacturer 1 washing machine owned by someone who lives in a rural area may need proactive service to mediate or prevent failures. This information can also be used to direct a person who lives in a rural area away from Manufacturer 1's washing machine. Yet further, such information can be used to allow Manufacturer 1 to correct that aspect of its washing machine that can be shown to cause failure when used with well-water.

Context-relevant data may also indicate that Manufacturer 1's washing machines manufactured on a specific date exhibit a high number of repairs, which could signal that a part used on that date was incorrectly manufactured or installed, thus, leading to a need for proactive notification to customers or even a recall. Instructions for preventing the error from occurring in the future may also be pertinent, thus allowing quality to be improved.

Context-relevant data may reveal that Manufacturer A's HVAC system has a propensity to need service or repair in areas of hotter weather, whereas Manufacturer B's HVAC system does not require service or repair as frequently. Such data can provide information that can be deployed to allow not only better selection of machines, devices, or systems for a specific location and use case, but also to enhance design of future machine, device, or systems.

Context-relevant information may indicate that a machine, devices, or systems that is under warranty is being used at a much higher frequency than most other machine, device, or systems of the same type. Such information may also provide evidence that the machine, device, or system is being used for purposes that the warranty prohibits, thus allowing the warranty to be voided.

In some situations, it can be useful to obtain information about the location where the machine, device, or system is installed. For example, if a location where a machine, device, or system is in use indicates that the users of the machine, device, or system do not appear to take care of their surroundings, it may be more likely that the machine, device, or system in that location is also not being taken care of and/or may be more likely to fail at an earlier date. Conversely, a location having a condition that would signal that the machine, device, or system may last longer could be assigned a better condition rating. For example, the technician could make observations during a service or repair events that a machine, device, or system is installed in a rental house with many residents who appear to use the machine, device, or system frequently, whereas at another service or repair events the technician could observe that a machine, device, or system is installed at a residence owned by single person who does not appear to subject the machine, device, or system to heavy use. In such a case, the machine, device, or system installed at the rental location could be assigned a lower condition rating, whereas the machine, device, or system at the residence could be assigned a higher condition rating.

Analysis of context-relevant machine, device, or system information can provide a homeowner with insight into whether it makes sense to pay for repairs for a machine, device, or system that is installed at her house, or whether she should invest in a new appliance. To this end, if analysis of database information indicates that the current condition state of her dishwasher indicates that it is likely that she will incur several hundred of dollars of service or repair costs in the next 3 years, she may decide that it is time to purchase a new one.

Such information can also be useful to improve the service quality of a technician and his employer, as well as to drive additional revenue to the company during a current service or repair event. To this end, a technician can often fix a machine, device, or system in current service or repair event to restore functionality, but other problems that may soon cause failure may remain invisible. The ability to predict a condition state for the machine, device, or system using historical data available from a library of information collected from a large number of machines, devices, or systems can also provide the technician (and the owner) with knowledge of whether additional repairs should be made while the technician is onsite.

Current condition state rating information can also have utility for companies that provide service contracts to the owners of machines, devices, or systems. Risk of underwriting a specific machine, device, or system having an unknown or only partially known condition and/or service history can be better managed when a condition state can be generated.

Still further, a library of historical machine, device, or system information can also have utility in the selection of a new machine, device, or system for a specific use-case. In this regard, the enriched data and associated information derivable therefrom can enhance the scope and quality of information available about a specific machine, device, or system or a collection of machines, devices, and systems. By way of explanation, a machine, device, or system may be appropriate for use in a first situation, but less optimum for another situation. Someone who is deciding on purchase of a type of machine, device, or system from a collection of available machine, device, or systems could benefit from information that can provide insight into whether a specific machine, device, or system is the right choice for her in context.

Referring to the washing machine example above, a person with a water supply that comes from a well would likely appreciate knowing that the Manufacturer 1's washing machine does not perform well with well water. In another example, customers may select their machine, device, or systems based on one or more factors, such as cost, features, design etc. However, currently there is a dearth of information about how much a machine, device, or system will cost during its working life. Generally, people may associate cost with quality and expected life, but this is an expectation that cannot be verified at the time of purchase of a new machine, device, or system. In fact, many expensive machines, devices, or systems fail as frequently as less expensive ones, thus likely making the total cost of ownership of the former greater in the aggregate. Today, little information exists regarding the expected lifespan of a machine, device, or system for a specific use case. That is, contextual information about machines, devices, or systems is currently lacking. The present disclosure enables the generation of enriched information that can assist consumers in their purchase decisions.

A prediction of a condition state can be generated for a time period of interest, for example a first time that is the time of purchase and a second time that can be a future date. The total cost of ownership of a machine, device, or system can be provided to, for example, inform a consumer of whether it makes sense to purchase an extended warranty for the machine, device, or system or whether it makes sense for a warranty service company to underwrite the extended warranty. For example, if the prediction indicates that a machine, device, or system of interest is likely to require service or repair within 3 years, a consumer may be more inclined to purchase an extended warranty. Similarly, an underwriter of an extended warranty can generate a contract pricing that more accurately reflects the cost of performing the services that are likely to be necessary.

The methodology can also be useful herein for digital twin processes, such as that disclosed in US Patent Publication No. 2019/0138970, the disclosure of which is incorporated herein in its entirety. A "digital twin" is a virtual representation of a physical object or system across its life cycle. In the context of the present disclosure, a digital twin is digital duplicate of one or a collection of physical assets of interest in a scene or a location. A collection of physical asset digital twins at a plurality of locations is also contemplated herein. Each digital twin or collection of digital twins have utility herein for the simulation of the operation of a physical asset of interest at a specific time, over one or more time periods, and over a lifecycle of the asset(s) or at the location in which an asset of interest is associated with (e.g., an HVAC unit, washing machine, etc.). Digital twin processes are disclosed in US Patent Publication Nos. and 2019/0138970 and 20190163215, the disclosures of which are incorporated herein in it entirety by this reference.

In such applications, an ongoing collection of information for objects or elements of interest can enable a continual aggregation of useful information and insights about the operation thereof. Relationships between a machines, devices, or systems and associated elements of interest at the same location or among different locations can also be generated. Because the digital twin processes can include semantic information about not only a specific machine, device, or system of interest but for collections of machines, devices, or systems of interest and the operations within and among them useful information and insights can be generated therefrom. When the methodology herein is configured with digital twin processes, such as that in the '970 Publication, can allow modeling of information and the generation of operational and condition information that are forward looking. Moreover, the generation of such information can allow continual knowledge generation for a machines, devices, or systems and collections or aggregations thereof.

When used in digital twin processes, the methodology herein can provide information and insights into the condition of machines, devices, or systems, components thereon, and proximate locations by providing a virtual representation upon which simulations can be conducted. Such processes can, for example, allow a prediction of whether maintenance or repair activities can be delayed or whether, and to what extent, such activities need to be conducted currently and/or at a one or more times in the future.

In an example relating to the commercial roof illustrated previously, a current condition on an HVAC unit (e.g., length of last coolant charge, etc.) can be modeled using a digital twin of that HVAC unit to determine the effect of an upcoming heat wave—or more broadly, the predicted use for the location for the upcoming summer season—to generate a plan for conducting maintenance or repair activities associated with the HVAC unit. When a plan is generated, the process can operate automatically in the background to monitor the plan in relation to the amount of use vis a vis the local temperature that was predicted and that which was used to generate the maintenance plan versus the actual amount of heat at that location. The maintenance or repair plan can be updated or modified for that HVAC unit based on generated information. Other maintenance and repair plans for other HVAC units at other locations can also be automatically updated. As would be appreciated, the use of the data generation and analysis methodology herein, and any information obtainable therefrom in display, report, dashboard for, as well as that which can be deployed in machine learning and digital twin processes can provide benefits such as:

Reducing costly emergency repairs by detecting problems early;
Generating pro-active maintenance plans;
Reducing/consolidating routine, but needed preventive maintenance;
Improving operational availability;
Increasing technician safety and reduce injuries resulting from dangerous inspection and repair activities;
Reducing costs by implementing parts inventories based on real data need assessments based on failure rates, logistical constraints, and downtime and consequence costs cost reduction;
Improving technician productivity;
Reducing total cost of ownership;
Enhancing deployment of knowledge throughout an organization; and
Delivering continuous improvements in an organization and among organizations.

Referring now to FIG. 1, shown is a flowchart illustrating an example of a technical training methodology as disclosed herein. Beginning at 103, a request for service of a machine, device, or system at a customer location can be received, e.g., by a computer (or other computing device) or user. A technician database can then be reviewed by the computer (or other computing device) at 106 to identify a technician having at least some of the technician skill sets associated with tasks pertinent to servicing the machine, device, or system at 109. The technician database can include a plurality of technician profiles corresponding to technicians who may be used to fulfill the service request. The technician profiles include indications of the skill sets obtained or possessed by the individual technicians. The identified technician can be dispatched to the customer location of the machine, device, or system at 112 to address the service request.

At 115, the technician can identify additional information about the machine, device, or system or can identify another machine, device, or system at the customer location. For example, the technician can generate an image of the data plate (or other identifying markings) on the machine, device, or system, which can be transmitted to the computer. This information can be used to determine if the technician has the servicing skill set needed to service the first or second machine, device, or system at 118. If the technician profile indicates that the technician lacks at least some of the skills necessary for servicing the first or second machine, device, or system while at the customer location, than at 121 the computer can present technician training materials associated with the appropriate machine, device, or system to the technician. The training materials can be viewable by the technician on a display device. In addition, the training materials can be provided in a variety of formats. For example, the training materials can be provided as one or more of a recorded video, a virtual reality environment, a game, a person, a virtual assistant, or through other appropriate media formats. The technician profile can be updated at 124 to record the presentation of the training materials to the technician for the machine, device, or system. The flow can return to 118 to confirm that the technician has the servicing skill set. If so, then the training methodology ends.

Figure 2:
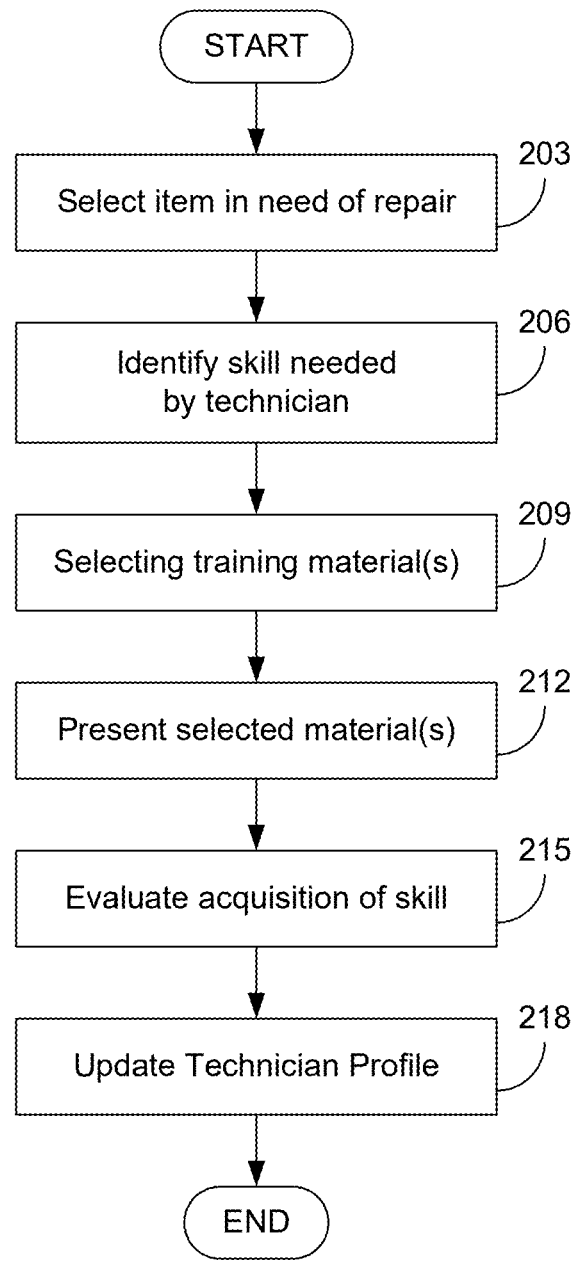

Referring next to FIG. 2, shown is another flowchart illustrating an example of a technical training methodology as disclosed herein. Beginning at 203, a machine, device, or system in need of, or potentially in need of, repair or servicing is selected by a user a technician or a computer or other computing device. At 206, at least one skill needed by the technician to service or repair of the machine, device, or system is identified. The needed skill or skills can be recorded in information in a technician database. The computer or other computing device can select one or more training materials for presentation to the technician to teach the needed skill at 209, and the training materials can be presented to the technician at 212. The one or more training materials can be included in a library of training materials in a technician training module and can be associated with the at least one skill associated with the service or repair of the machine, device, or system.

At 215, the computer or other computing device can evaluate whether the technician has acquired the at least one skill after being presented the materials. For example, the technician can provide feedback regarding the training materials and their effectiveness or ranking. The technician profile information associated with the at least one skill can then be updated by the computer or other computing device for the technician.

Figure 3:
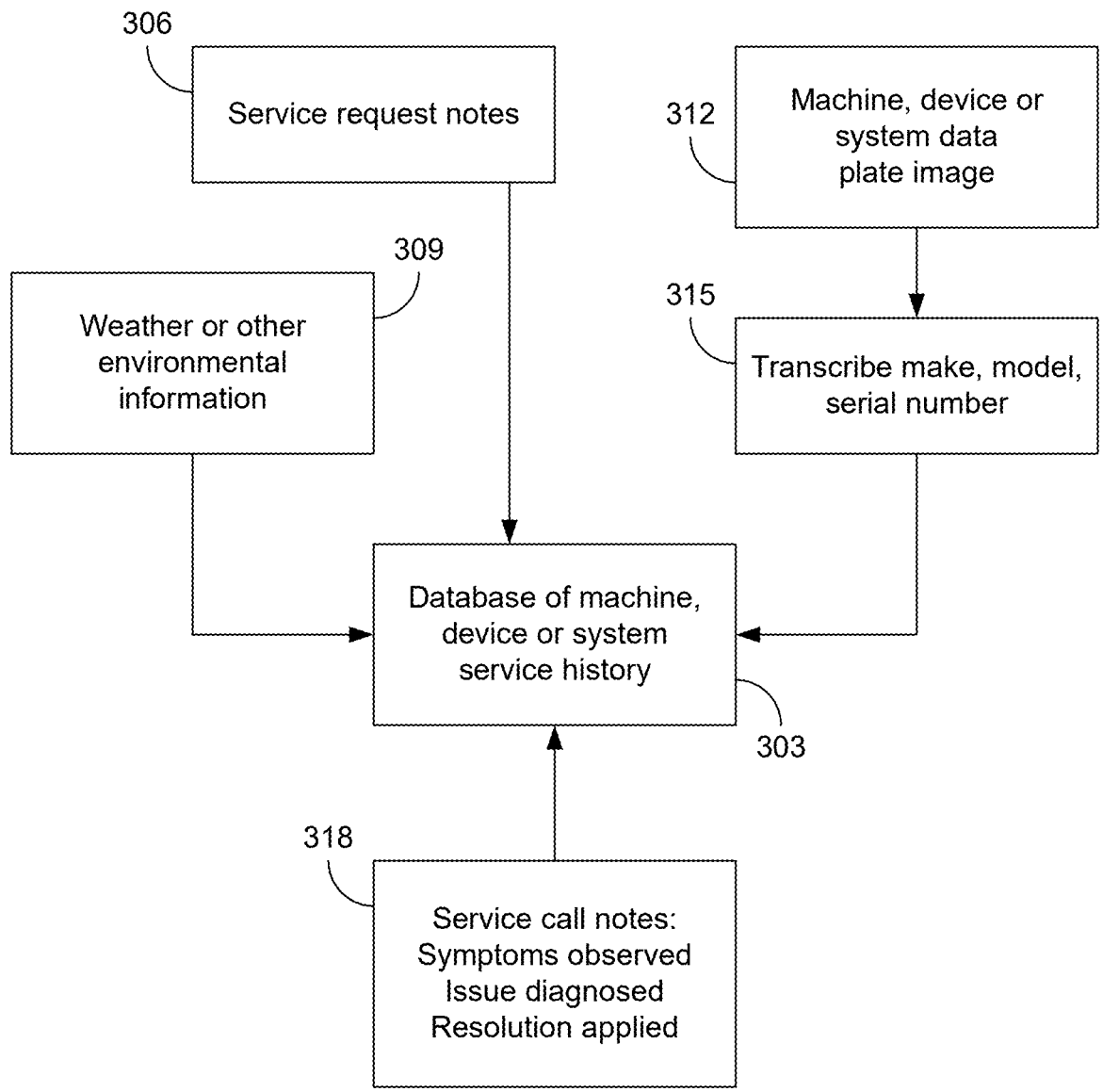
FIG. 3 illustrates an example of sources of information used to generate a service history database for a machine, device, or system, in accordance with various aspects of the present disclosure.

FIG. 3 illustrates an example of the sources of information that can be used to generate the database of machine, device, or system service history 303, which can be used in the identification of skills needed by a technician for service or repair of the machine device or system and the determination of courses that would provide those skills. As shown in FIG. 3, service request notes 306 can be transcribed and included in the service history database 303. For example, verbal or written notes about, or images of, the machine, device, or system from a request for service can be transcribed and added to the information about the machine, device, or system. In addition, weather or other environmental information 309 than may have an effect on the machine, device, or system can also be obtained or collected and included in the service history database 303.

In addition, the data plate (or other identifying markings) of the machine, device, or system 312 can also be obtained (e.g., through a captured image) by a user submitting the request for service or by the technician at the customer location. The obtained information can be transcribed 315 to collect and document, e.g., the make, model and serial number of the machine, device, or system. For example, an image of the data plate can be processed by the computer or other computing device to recognize the information inscribed on it. If the information is recognized as part of the service history database 303, then the transcription can finish. If not, a data plate model can be generated and published as part of the service history database. Additional information about the data plate or the machine, device, or system can also be generated as content for the service history database 303. Review of the content of the information can be carried out before it is made available.

Service call notes 318, which can be generated by the technician during the service call can also form an important part of the database of the machine, device, or system service history. For example, the technician can provide indications of the symptoms that were observed, the diagnosis of the issue, and/or the resolution applied to the machine, device, or system. This information can be provided in a wide range of formats such as, e.g., written, audio, video or other appropriate format that conveys the desired information. For example, audio or video messages capturing the diagnosis and/or resolution process can be transcribed for publication in the service history database 303. Review of the transcribed content can be carried out and application of a tag identifying the content applied before it is made available. The tag can include information identifying the machine, device, or system as well as identifying the methods being used by the technician.

Figure 4:
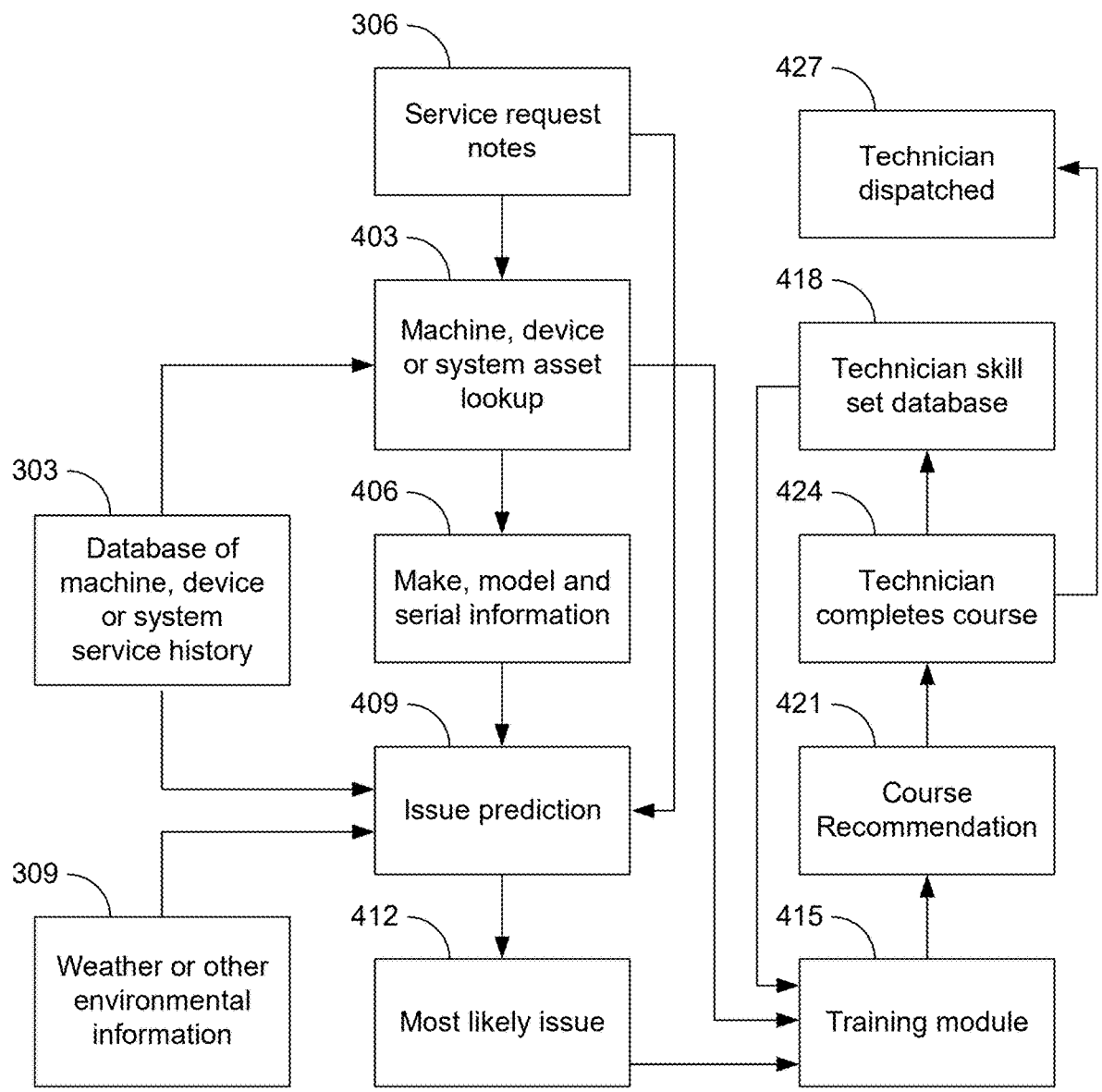
FIG. 4 illustrates an example of training course recommendation determination for the technical training being provided to a technician, in accordance with various aspects of the present disclosure.

Referring next to FIG. 4, shown is an example of a technical training methodology for identifying training course recommendations. Beginning at 403, an asset lookup is carried out for the machine, device, or system using the service history database 303 and the service request notes 306 of FIG. 3. This allows the make, model and serial information of the machine, device, or system to be identified at 406, which can be used by the computer or other computing device to provide one or more issue prediction(s) at 409. This can be based on the database information for that specific machine, device, or system, in addition to the service history information for similar machines, devices or systems. Current weather or other environmental information can be obtained and use in the prediction of the potential issue with the machine, device, or system. The most likely issue can be identified at 412.

The training module 415 of the technical training application can then evaluate the potential issue and to make one or more course recommendation 421 based on the information contained in the technician profiles of the technician skill set data base 418. When the technician completes the recommended course(s) at 424, the technician can be dispatched 427 to address the service request at the customer location. In addition, technician's profile in the technician skill set database 418 can be updated to indicate that the training has been received.

Figure 5:
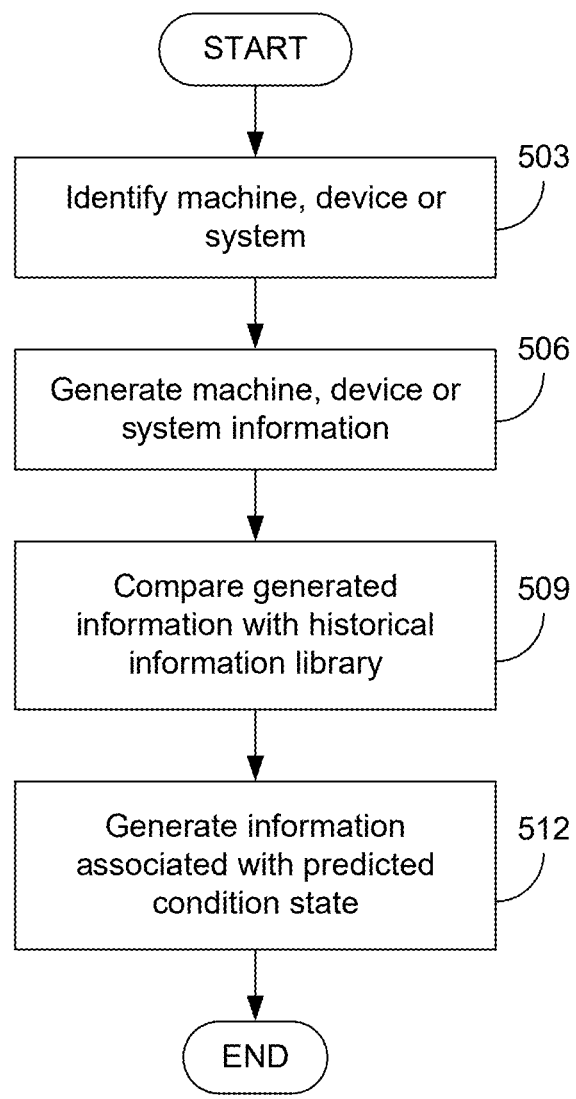
FIG. 5 illustrates an example of generation of condition state information associated with a machine, device, or system, in accordance with various aspects of the present disclosure

Referring now to FIG. 5, shown is an example of a method for generation of condition state information associated with a machine, device, or system. Beginning at 503, a machine, device, or system is identified where condition state information is of interest. Machine, device, or system information is then generated at 506. The machine, device, or system information can be generated from machine, device, or system baseline information associated with, e.g., type, manufacturer, model number, serial number, date of manufacture, and/or manufacturer provided technical specification(s). The machine, device, or system information can be generated from machine, device, or system usage information comprising one, some or all of, e.g., purchase date, information associated with a use location, and/or owner or user information, information associated with one or more previous service or repair events.

At 509, the generated machine, device, or system information can be compared with a historical information library of machine, device, or system information derived from a plurality of machines, devices, or systems. The library can comprise historical information for each of the plurality of machines, devices or systems. The historical information can be associated with some or all of, e.g., type, manufacturer, model number, serial number, date of manufacture, manufacturer provided technical specification(s), purchase date, information associated with use location, owner or user information, and/or information associated with one or more prior service or repair events. Information associated with a predicted condition state for the machine, device, or system can then be generated at 512.

Figure 6:
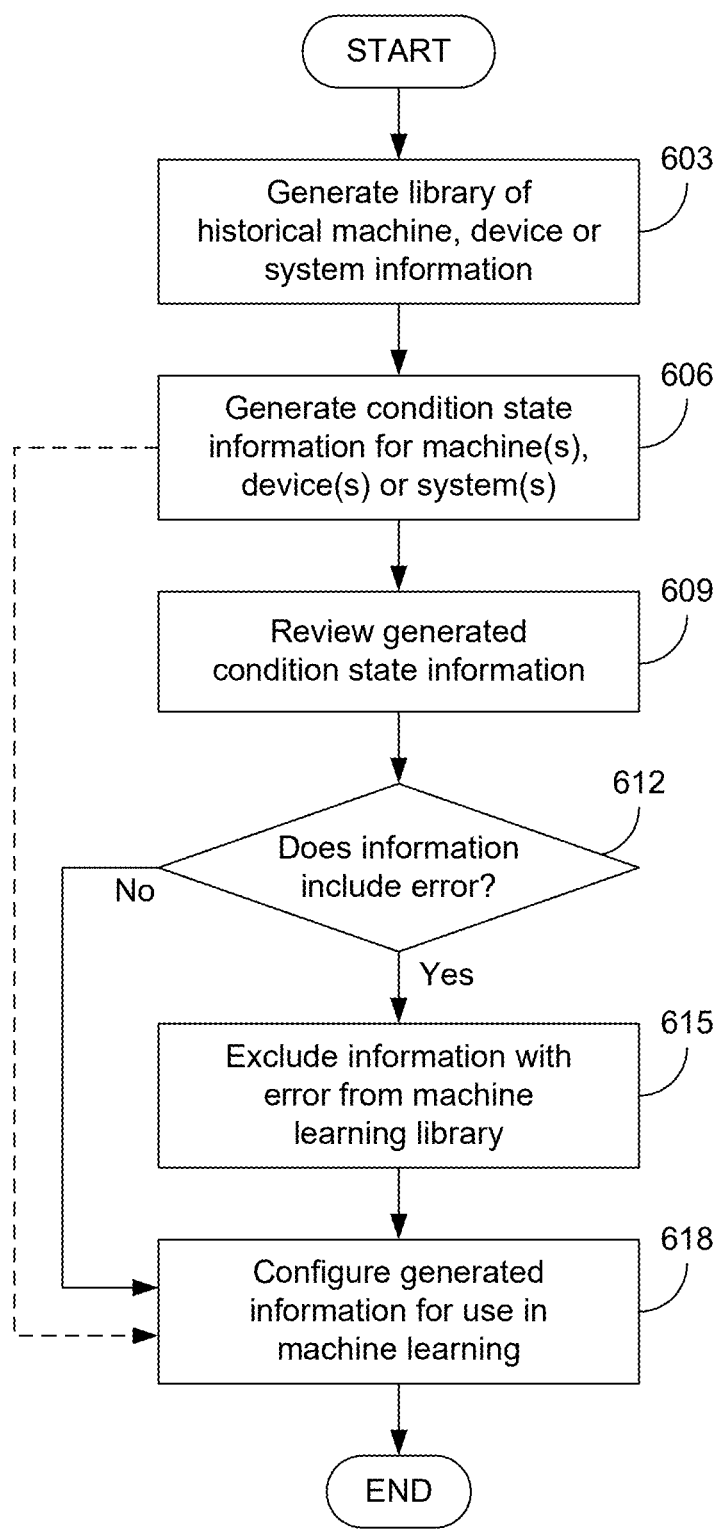
FIG. 6 illustrates an example of machine learning information library in determining condition state information for a machine, device, or system of interest, in accordance with various aspects of the present disclosure

Referring next to FIG. 6, shown is an example of a method for machine learning information library in determining condition state information for a machine, device, or system of interest. Beginning at 603, a library of historical machine, device, or system information associated with a plurality of machines, devices, or systems can be generated. The historical machine, device, or system information can comprise machine, device, or system information associated with, e.g., type, manufacturer, model number, serial number, date of manufacture, manufacturer provided technical specification(s), purchase date, information associated with a use location, and/or owner or user information. The historical machine, device, or system information can comprise, e.g., information associated with one or more prior service or repair events comprising, e.g., machine, device, or system serial number; machine, device, or system location information; machine, device, or system condition information; machine, device, or system usage information; technician demographic information; an amount of technician time associated with completion of a prior service or repair event; type of parts associated with a prior service or repair event; cost of parts associated with a prior service or repair event; and/or feedback associated with a prior service or repair event.

Condition state information for one or more machines, devices, or systems of interest can then be generated at 606 and at least some of the generated condition state information can be reviewed at 609 for one or more errors. In various embodiments, the generated condition state information can be presented to a human reviewer at 609. The human reviewer can review the presented information to determine if it includes one or more error. Other review methods (e.g., automated, manual, or a combination of both) can be used to determine if an error is present in the generated condition state information. If, at 612, it is determined that the presented condition state information includes one or more errors, then that condition state information comprising the one or more errors is excluded from a machine learning library at 615. When the condition state information comprising the error(s) is excluded or the condition state information does not include errors, it can be configured for use in machine learning processes for condition state determinations for either or both of a machine, device, or system or a collection of additional machines, devices, or systems at 618. In some implementations, the review at 609 and exclusion at 615 can be bypassed and the condition state information generated at 606 can be configured for use in machine learning processes for condition state determinations for either or both of a machine, device, or system or a collection of additional machines, devices, or systems at 618.

Figure 7:
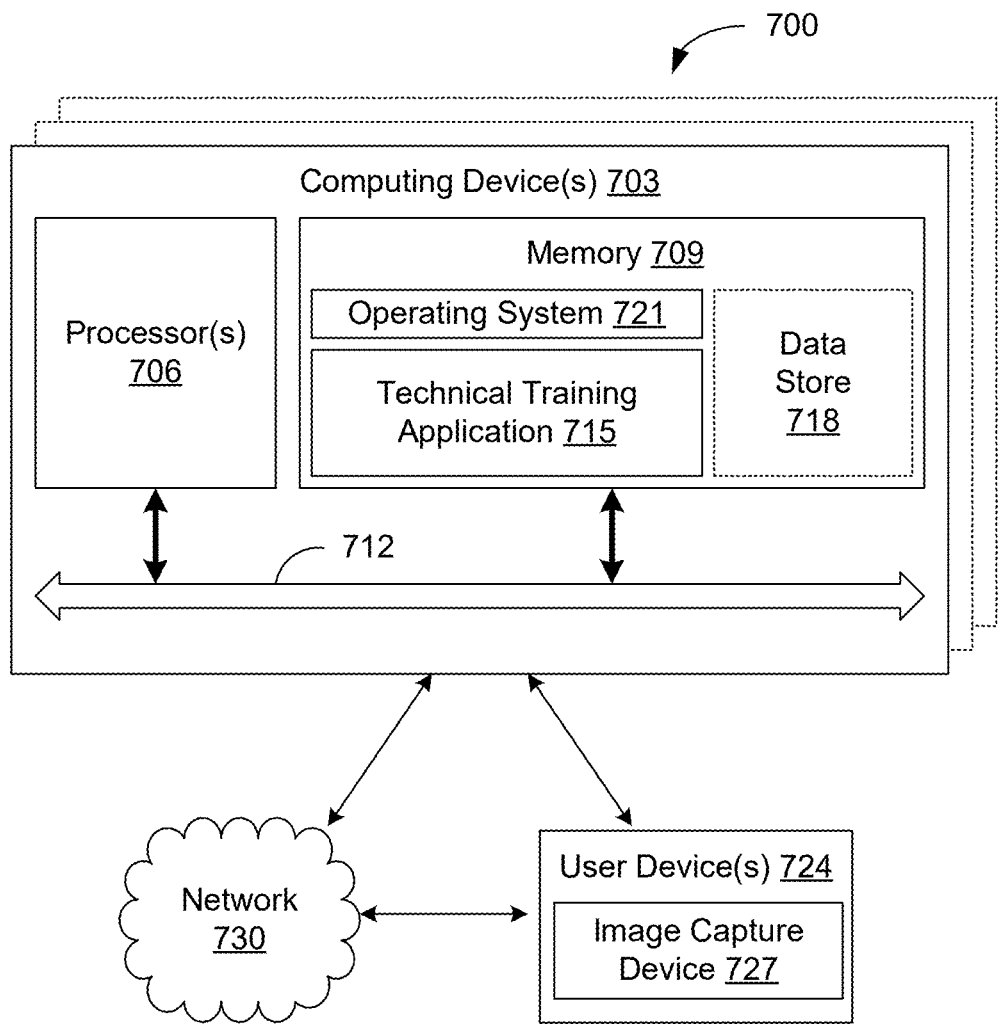
FIG. 7 is a block diagram illustrating an example of a system that can be used for a data acquisition planning methodology, in accordance with various aspects of the present disclosure.

Referring now to FIG. 7, shown is an example of a system 700 that may be utilized for the technical training methodology disclosed herein. The system 700 can be one or more computing device(s) 703 or other processing device(s), which includes at least one processor circuit, for example, having a processor 706 and a memory 709, both of which are coupled to a local interface 712. To this end, the computing device(s) 703 may comprise, for example, a server computer, mobile computing device (e.g., laptop, tablet, smart phone, etc.) or any other system providing computing capability. The computing device(s) 703 may include, for example, one or more display or touch screen devices and various peripheral devices. Even though the computing device 703 is referred to in the singular, it is understood that a plurality of computing devices 703 may be employed in the various arrangements as described above. The local interface 712 may comprise, for example, a data bus with an accompanying address/control bus or other bus structure as can be appreciated.

Stored in the memory 709 are both data and several components that are executable by the processor 706. In particular, stored in the memory 709 and executable by the processor 706 include a technical training application 715 and potentially other applications. The technical training application 715 can include one or more training module(s), assessment module(s), scoring module(s), help module(s), or other appropriate module or combination of modules thereof to implement the technical training methodology disclosed herein. Also stored in the memory 709 may be a data store 718 and other data. The data stored in the data store 718, for example, is associated with the operation of the various applications and/or functional entities described below. For example, the data store may include databases, object libraries, and other data or information as can be understood. In addition, an operating system 721 may be stored in the memory 709 and executable by the processor 706. The data store 718 may be located in a single computing device or may be dispersed among many different devices. The components executed on the computing device 703 include, for example, the technical training application 715 and other systems, applications, services, processes, engines, or functionality not discussed in detail herein. It is understood that there may be other applications that are stored in the memory 709 and are executable by the processor 706 as can be appreciated. Where any component discussed herein is implemented in the form of software, any one of a number of programming languages may be employed.

The system 700 can be configured to communicate with one or more user device(s) 724 (e.g., a virtual reality system, mobile computing device or other mobile user device) which can include an image capture device 727. For example, the user device(s) 724 can be communicatively coupled to the computing device(s) 703 either directly through a wireless communication link or other appropriate wired or wireless communication channel, or indirectly through a network 730 (e.g., WLAN, internet, cellular or other appropriate network or combination of networks). In this way, capture plan information, acquired image information or other information can be communicated between the computing device(s) 703 and user device(s) 724.

A number of software components can be stored in the memory 709 and are executable by the processor 706. In this respect, the term "executable" means a program file that is in a form that can ultimately be run by the processor 706. Examples of executable programs may be, for example, a compiled program that can be translated into machine instructions in a format that can be loaded into a random access portion of the memory 709 and run by the processor 706, source code that may be expressed in proper format such as object code that is capable of being loaded into a random access portion of the memory 709 and executed by the processor 706, or source code that may be interpreted by another executable program to generate instructions in a random access portion of the memory 709 to be executed by the processor 706, etc. An executable program may be stored in any portion or component of the memory 709 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 706 may represent multiple processors 706 and the memory 709 may represent multiple memories 709 that operate in parallel processing circuits, respectively. In such a case, the local interface 712 may be an appropriate network that facilitates communication between any two of the multiple processors 706, between any processor 706 and any of the memories 709, or between any two of the memories 709, etc. The local interface 712 may comprise additional systems designed to coordinate this communication, including, for example, performing load balancing. The processor 706 may be of electrical or of some other available construction.

Although the technical training application 715, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Any logic or application described herein, including the technical training application 715, that comprises software or instructions can be embodied in any non-transitory computer-readable medium for use by or in connection with an instruction execution system such as, for example, a processor 706 in a computer system or other system. In this sense, the logic may comprise, for example, statements including instructions and declarations that can be fetched from the computer-readable medium and executed by the instruction execution system. The flowcharts or diagrams of FIGS. 1-6 show examples of the architecture, functionality, and operation of possible implementations of a technical training application 715. In this regard, each block can represent a module, segment, or portion of code, which comprises one or more executable instructions for implementing the specified logical function(s). It should also be noted that in some alternative implementations, the functions noted in the blocks may occur out of the order noted in FIGS. 1-6. For example, two blocks shown in succession in FIGS. 1-6 may in fact be executed substantially concurrently or the blocks may sometimes be executed in a different or reverse order, depending upon the functionality involved. Alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Communication media appropriate for use in or with the inventions of the present disclosure may be exemplified by computer-readable instructions, data structures, program modules, or other data stored on non-transient computer-readable media, and may include any information-delivery media. The instructions and data structures stored on the non-transient computer-readable media may be transmitted as a modulated data signal to the computer or server on which the computer-implemented methods of the present disclosure are executed. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term "computer-readable media" as used herein may include both local non-transient storage media and remote non-transient storage media connected to the information processors using communication media such as the internet. Non-transient computer-readable media do not include mere signals or modulated carrier waves, but include the storage media that form the source for such signals.

In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

At this time, there is little distinction left between hardware and software implementations of aspects of systems; the use of hardware or software is generally (but not always, in that in certain contexts the choice between hardware and software can become significant) a design choice representing cost vs. efficiency tradeoffs. There are various information-processing vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various aspects of the devices and/or processes for system configuration via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the aspects disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal-bearing medium include, but are not limited to, the following: a recordable type medium such as a floppy disk, a hard disk drive, a CD, a DVD, a digital tape, a computer memory, etc.; and a remote non-transitory storage medium accessed using a transmission type medium such as a digital and/or an analog communication medium (e.g., a fiber optic cable, a waveguide, a wired communications link, a wireless communication link, etc.), for example a server accessed via the internet.

Those skilled in the art will recognize that it is common within the art to describe devices and/or processes in the fashion set forth herein, and thereafter use engineering practices to integrate such described devices and/or processes into data-processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As described herein, the exemplary aspects have been described and illustrated in the drawings and the specification. The exemplary aspects were chosen and described in order to explain certain principles of the invention and their practical application, to thereby enable others skilled in the art to make and utilize various exemplary aspects of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of generating information associated with a collection of machines, devices, or systems present at a location, comprising:
   a. selecting a location associated with a collection comprising a plurality of machines, devices, or systems for which condition state information is of interest;
   b. generating information associated with the plurality of machines, devices, or systems in the collection, wherein the information is derived from:
      i. machine, device, or system baseline information associated with each of:
         1. Type;
         2. Manufacturer;
         3. model number;
         4. Serial number;
         5. Date of manufacture; and
         6. Manufacturer-provided technical specifications;

ii. machine, device, or system usage information comprising some or all of:
   1. Purchase date;
   2. Information associated with a use location;
   3. owner or user information; and
   4. Information associated with one or more previous service or repair events;
c. deriving, by a computer, context-relevant information associated with the collection from a historical library of machine, device, or system information;
d. analyzing, by the computer, the context-relevant information to generate condition state information for the collection, wherein the collection condition state information is configured as:
   i. current or future condition state ratings for one or more machines, devices, or systems in the collection;
   ii. current or future condition state ratings for the collection;
   iii. costs associated with ownership or management of the plurality of machines, devices, or systems in the collection from a first time to a second time; or
   iv. costs associated with management of the collection from the first time to the second time;
e. generating, by the computer, a recommendation associated with whether one or more of the plurality of machines, devices, or systems in the collection should be replaced at a current time or at a later time, thereby providing condition state information for one or more of the plurality of machines, devices, or systems in the collection; and
f. configuring, by the computer, the condition state information for use in one or more of:
   i. a user notification;
   ii. a report;
   iii. a dashboard;
   iv. as information for use in a current service or repair event associated with one or more of the machines, devices, or systems in the collection; or
   v. as information for use in subsequent condition state generation determinations for one or more of the machines, devices, or systems in the same or a different collection of one or more additional machines, devices, or systems of interest.

2. The method of claim 1, wherein the recommendation is associated with a prediction of a number and type of future service or repair events associated with the one or more machines, devices, or systems in the collection.

3. The method of claim 1, wherein the context-relevant information includes for the plurality of machines, devices, or systems some or all of:
a. purchase dates;
b. installation location;
c. usage relevant observations; and
d. information associated with one or more previous service or repair events.

4. The method of claim 3, wherein the usage-relevant observations include some or all of:
a. approximate amount of use;
b. maintenance observations; and
c. owner or user demographics.

5. The method of claim 1 further comprising providing a recommendation to an owner or manager for use in selection of a new machine, device, or system for a specific use-case.

6. The method of claim 1, wherein the condition state information is used in a subsequent generation of condition state information for the same collection or a different collection.

7. The method of claim 1, wherein the collection condition state information is generated automatically by the computer.

8. The method of claim 7, wherein the computer-generated collection state information is provided to a human for review, and wherein human-reviewed condition state information is used in a subsequent generation of condition state information for the collection or a different collection.

9. The method of claim 1, wherein the collection condition state information is incorporated into machine learning library information for use in subsequent generation of condition state information.

10. The method of claim 1, comprising communicating the recommendation to a technician, customer, or owner associated with the selected location associated with the collection.

11. A method of generating information associated with a condition state for a collection of machines, devices, or systems at a location comprising:
a. selecting a location associated with a collection of machines, devices, or systems for which condition state information is of interest;
b. generating information for the machines, devices, or systems in the collection, wherein the information is derived from:
   i. machine, device, or system baseline information associated with each of:
      1. Type;
      2. Manufacturer;
      3. model number;
      4. Serial number;
      5. Date of manufacture; and
      6. Manufacturer-provided technical specifications;
   ii. machine, device, or system usage information comprising some or all of:
      1. Purchase date;
      2. Information associated with a use location;
      3. owner or user information; and
      4. Information associated with one or more previous service or repair events;
c. deriving, by a computer, context-relevant information associated with the collection from a library of machine, device, or system information;
d. analyzing, by the computer, the context-relevant information to generate condition state information for the collection, wherein the collection condition state information is configured as:
   i. current or future condition state ratings for one or more machines, devices, or systems in the collection;
   ii. current or future condition state ratings for the collection;
   iii. costs associated with ownership or management of the machines, devices, or systems in the collection from a first time to a second time; or
   iv. costs associated with management of the collection from the first time to the second time;
e. configuring, by the computer, the collection condition state information for use in one or more of:
   i. a user notification;
   ii. a report;
   iii. a dashboard;
   iv. as information for use in a current service or repair event associated with one or more of the machines, devices, or systems in the collection; or
   v. as information for use in subsequent condition state generation determinations for one or more of the machines, devices, or systems in the same or a different collection of one or more additional machines, devices, or systems of interest; and f. incorporating the collection condition state information into machine learning library information for use in subsequent generation of condition state information.

12. The method of claim 11, wherein the collection condition state information further includes a prediction of a number and type of future service or repair events associated with one or more machines, devices, or systems in the collection.

13. The method of claim 11, further comprising generating a recommendation of whether one or more machines, devices, or systems in the collection need to be replaced at a current time or at a future time.

14. The method of claim 11, wherein the context-relevant information includes for the machines, devices, or systems some or all of:
  a. purchase dates;
  b. installation location;
  c. usage relevant observations; and
  d. information associated with one or more previous service or repair events.

15. The method of claim 14, wherein the usage-relevant observations include some or all of:
  a. approximate amount of use;
  b. maintenance observations; and
  c. owner or user demographics.

16. The method of claim 11 further comprising providing a recommendation to an owner or manager for use in the selection of a new machine, device, or system for a specific use-case.

17. The method of claim 11, wherein the condition state information is used in a subsequent generation of condition state information for the collection or a different collection.

18. The method of claim 11, wherein the collection condition state information is generated automatically by the computer.

19. The method of claim 18, wherein the computer-generated collection state information is provided to a human for review, and wherein human-reviewed condition state information is used in a subsequent generation of condition state information for the collection or a different collection.

* * * * *